(12) United States Patent
Sasaki et al.

(10) Patent No.: US 10,625,772 B2
(45) Date of Patent: Apr. 21, 2020

(54) POWER STEERING APPARATUS AND CONTROL APPARATUS FOR POWER STEERING APPARATUS

(71) Applicant: HITACHI AUTOMOTIVE SYSTEMS, LTD., Hitachinaka-shi, Ibaraki (JP)

(72) Inventors: Mitsuo Sasaki, Hadano (JP); Makoto Goto, Isehara (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 189 days.

(21) Appl. No.: 15/771,570

(22) PCT Filed: Oct. 31, 2016

(86) PCT No.: PCT/JP2016/082243
§ 371 (c)(1),
(2) Date: Apr. 27, 2018

(87) PCT Pub. No.: WO2017/077973
PCT Pub. Date: May 11, 2017

(65) Prior Publication Data
US 2018/0312191 A1    Nov. 1, 2018

(30) Foreign Application Priority Data
Nov. 4, 2015   (JP) .................. 2015-216317

(51) Int. Cl.
*B62D 5/04*   (2006.01)
*B62D 6/00*   (2006.01)

(52) U.S. Cl.
CPC .......... *B62D 5/0463* (2013.01); *B62D 5/049* (2013.01); *B62D 5/0484* (2013.01); *B62D 5/0487* (2013.01); *B62D 6/00* (2013.01)

(58) Field of Classification Search
CPC .. B62D 5/0463; B62D 5/0484; B62D 5/0487; B62D 5/049; B62D 6/00
See application file for complete search history.

(56) References Cited

U.S. PATENT DOCUMENTS

| | | | |
|---|---|---|---|
| 2010/0174442 A1* | 7/2010 | Nishimori | B62D 5/0472 701/31.4 |
| 2012/0232759 A1* | 9/2012 | Oniwa | B62D 5/0463 701/41 |

(Continued)

FOREIGN PATENT DOCUMENTS

| JP | 2012-025262 A | 2/2012 |
|---|---|---|
| JP | 2013-220702 A | 10/2013 |

(Continued)

*Primary Examiner* — Sze-Hon Kong
(74) *Attorney, Agent, or Firm* — Foley & Lardner LLP

(57) ABSTRACT

One of objects of the present invention is to provide a power steering apparatus capable of improving accuracy of abnormality detection. A power steering apparatus includes a steering mechanism configured to transmit a rotation of a steering wheel to a turning target wheel, an electric motor configured to provide a steering force to the steering mechanism, a torque sensor configured to detect a steering torque generated on the steering mechanism, and a control unit configured to calculate, based on the steering torque, an instruction signal for controlling driving of the electric motor and output the instruction signal to the electric motor. The control unit includes a steering direction signal reception portion configured to receive a steering direction signal indicating a rotational direction of the steering wheel, and an abnormality detection circuit configured to carry out detection of an abnormality in the power steering apparatus based on a change in the steering torque in a predetermined region including a region in which the steering direction signal is switched.

20 Claims, 15 Drawing Sheets

(56) References Cited

U.S. PATENT DOCUMENTS

| | | | |
|---|---|---|---|
| 2013/0066523 A1* | 3/2013 | Iwamoto | B62D 5/0493 701/41 |
| 2013/0179039 A1* | 7/2013 | Uryu | B62D 5/0463 701/42 |
| 2013/0304327 A1* | 11/2013 | Morishita | B62D 5/0463 701/43 |
| 2014/0200771 A1* | 7/2014 | Yabuguchi | B62D 5/0493 701/41 |
| 2014/0222295 A1* | 8/2014 | Dornhege | B62D 6/002 701/42 |
| 2015/0175193 A1* | 6/2015 | Endo | B62D 5/0487 701/29.2 |
| 2016/0001815 A1 | 1/2016 | Sasaki | |
| 2016/0132055 A1* | 5/2016 | Matsuno | B60W 50/10 701/23 |

FOREIGN PATENT DOCUMENTS

| | | |
|---|---|---|
| JP | 2014-234102 A | 12/2014 |
| WO | WO-2014/148086 A1 | 9/2014 |

\* cited by examiner

POWER STEERING APPARATUS AND CONTROL APPARATUS FOR POWER STEERING APPARATUS

TECHNICAL FIELD

The present invention relates to a power steering apparatus.

BACKGROUND ART

PTL 1 discloses a power steering apparatus that avoids deterioration of an operation of a power transmission mechanism due to entry of water into a housing.

CITATION LIST

Patent Literature

PTL 1: Japanese Patent Application Public Disclosure No. 2014-234102

SUMMARY OF INVENTION

Technical Problem

One of objects of the present invention is to provide a power steering apparatus capable of improving accuracy of abnormality detection.

Solution to Problem

A power steering apparatus according to one embodiment of the present invention includes an abnormality detection circuit configured to carry out abnormality detection based on a change in a steering torque in a predetermined region including a region in which a steering direction signal is switched.

Therefore, the present invention can improve the accuracy of the abnormality detection.

DESCRIPTION OF EMBODIMENTS

First Embodiment

Figure 1:
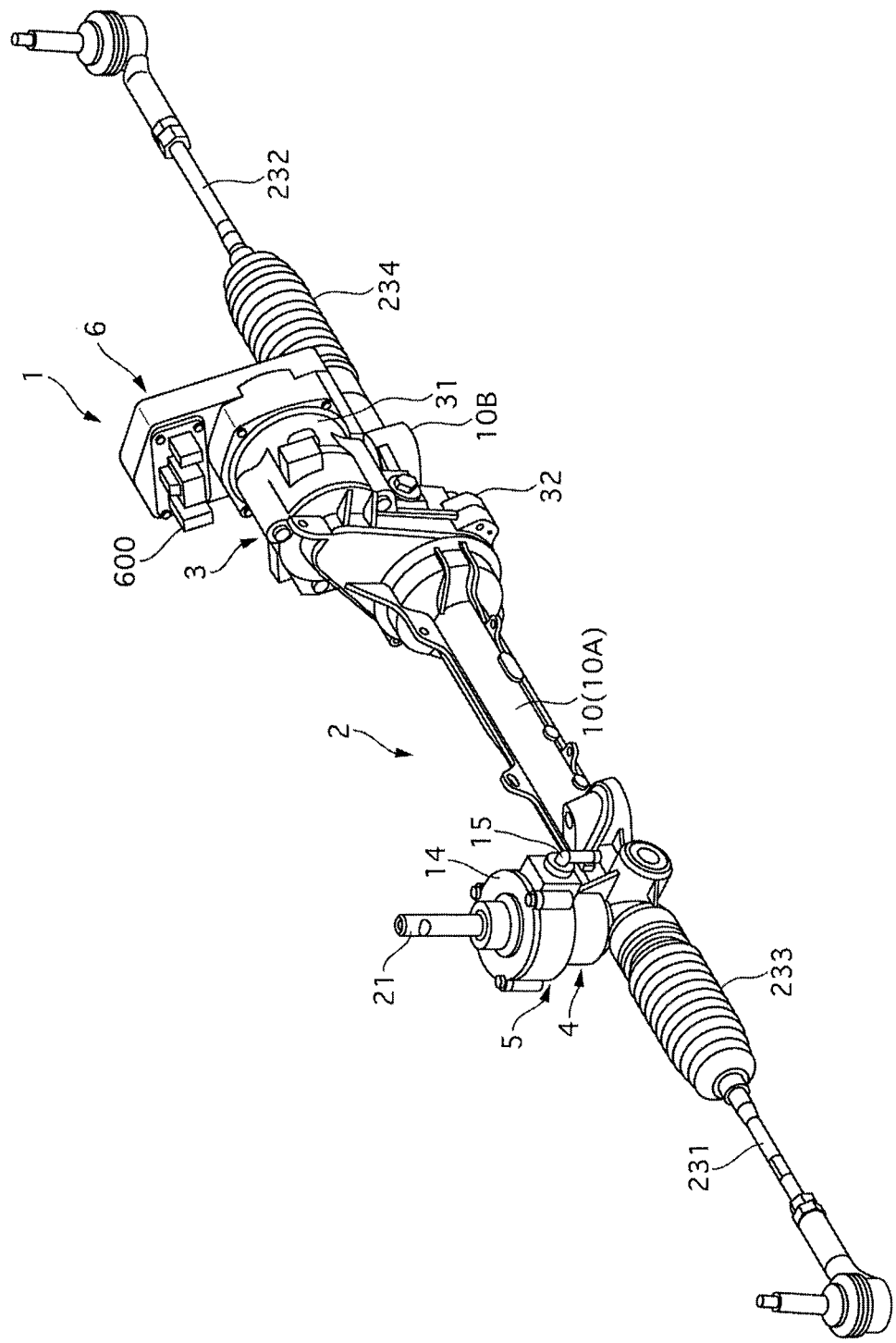
FIG. 1 is a perspective view of a power steering apparatus according to a first embodiment.
Figure 2:
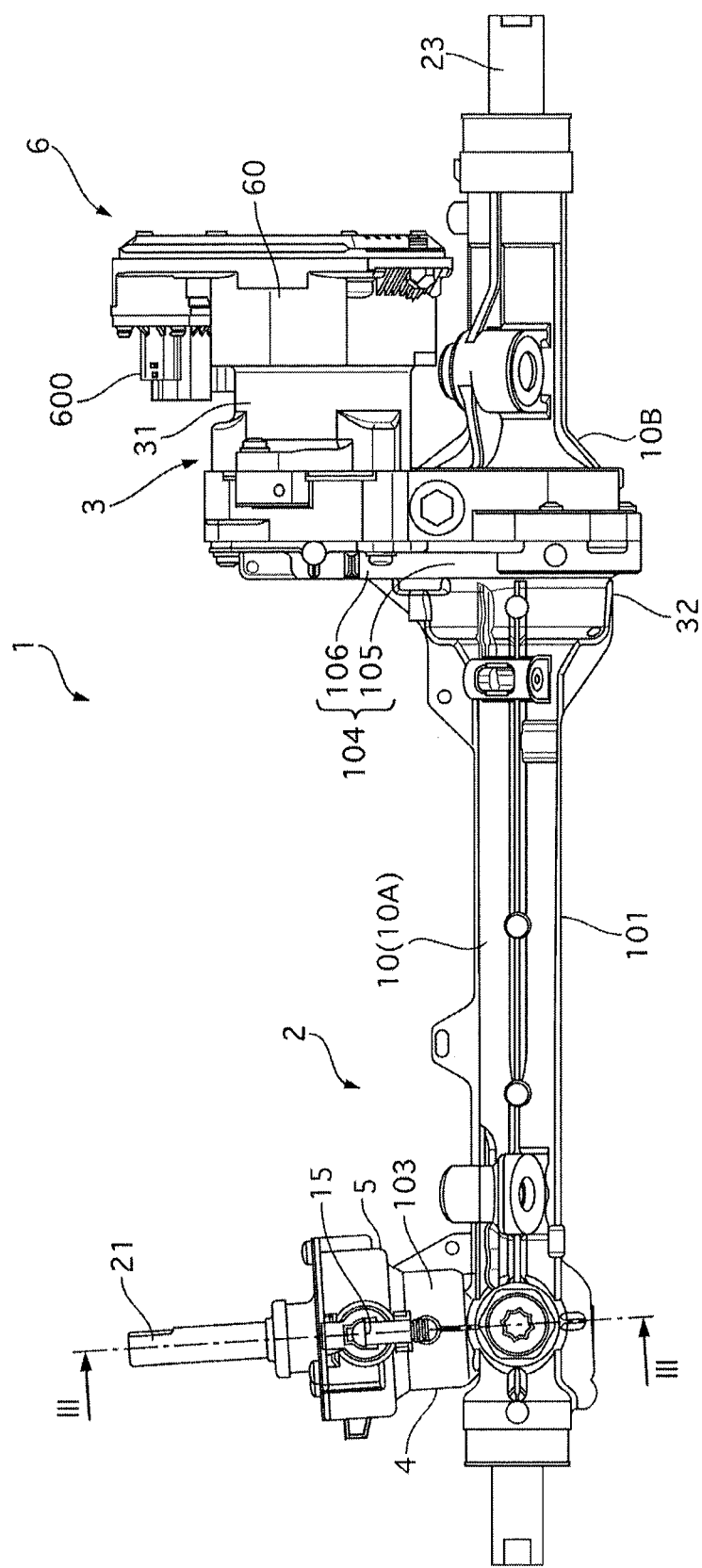
FIG. 2 is a front view of the power steering apparatus according to the first embodiment.
Figure 3:
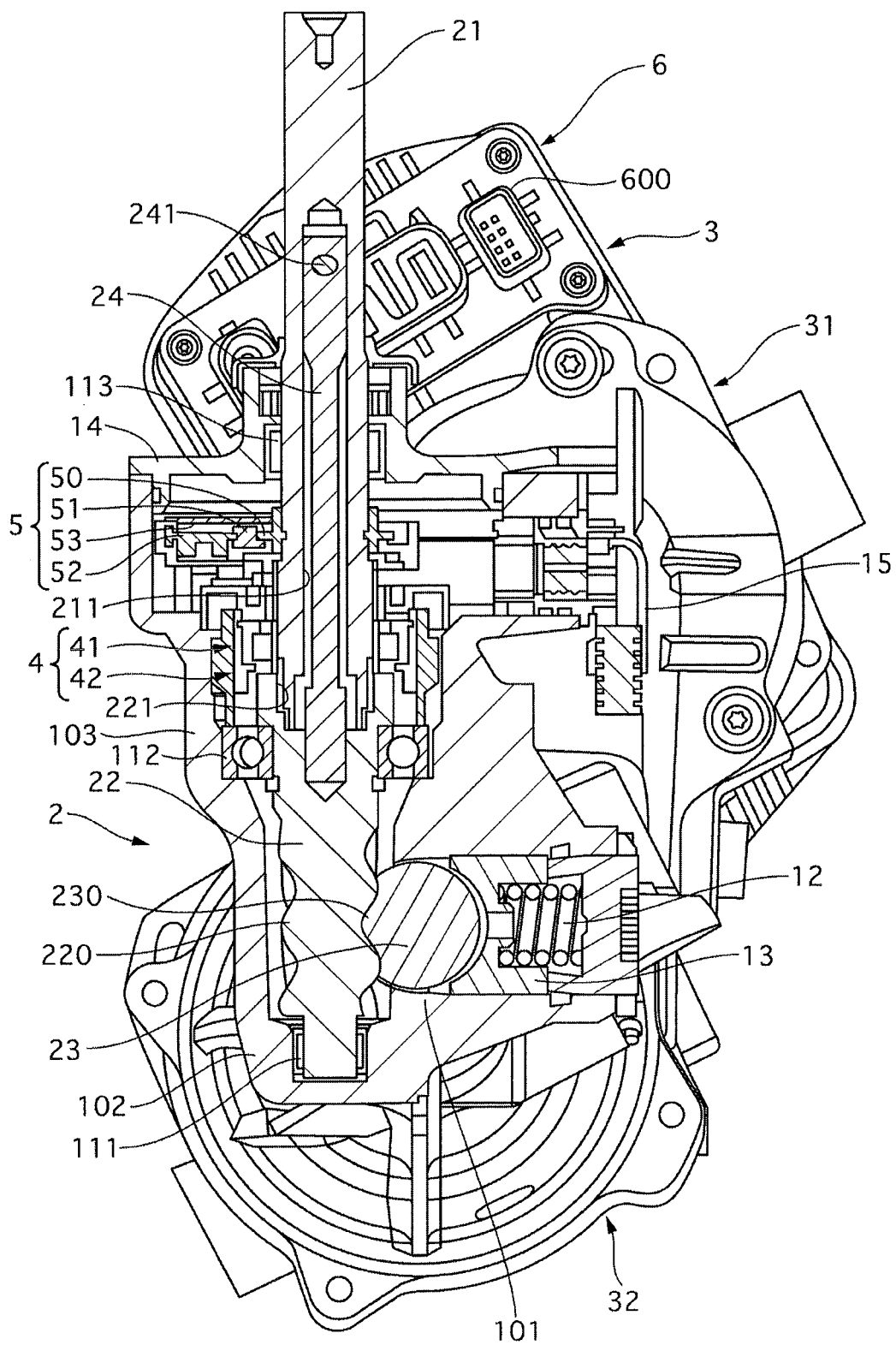
FIG. 3 is a cross-sectional view as viewed along a line III-III illustrated in FIG. 2.
Figure 4:
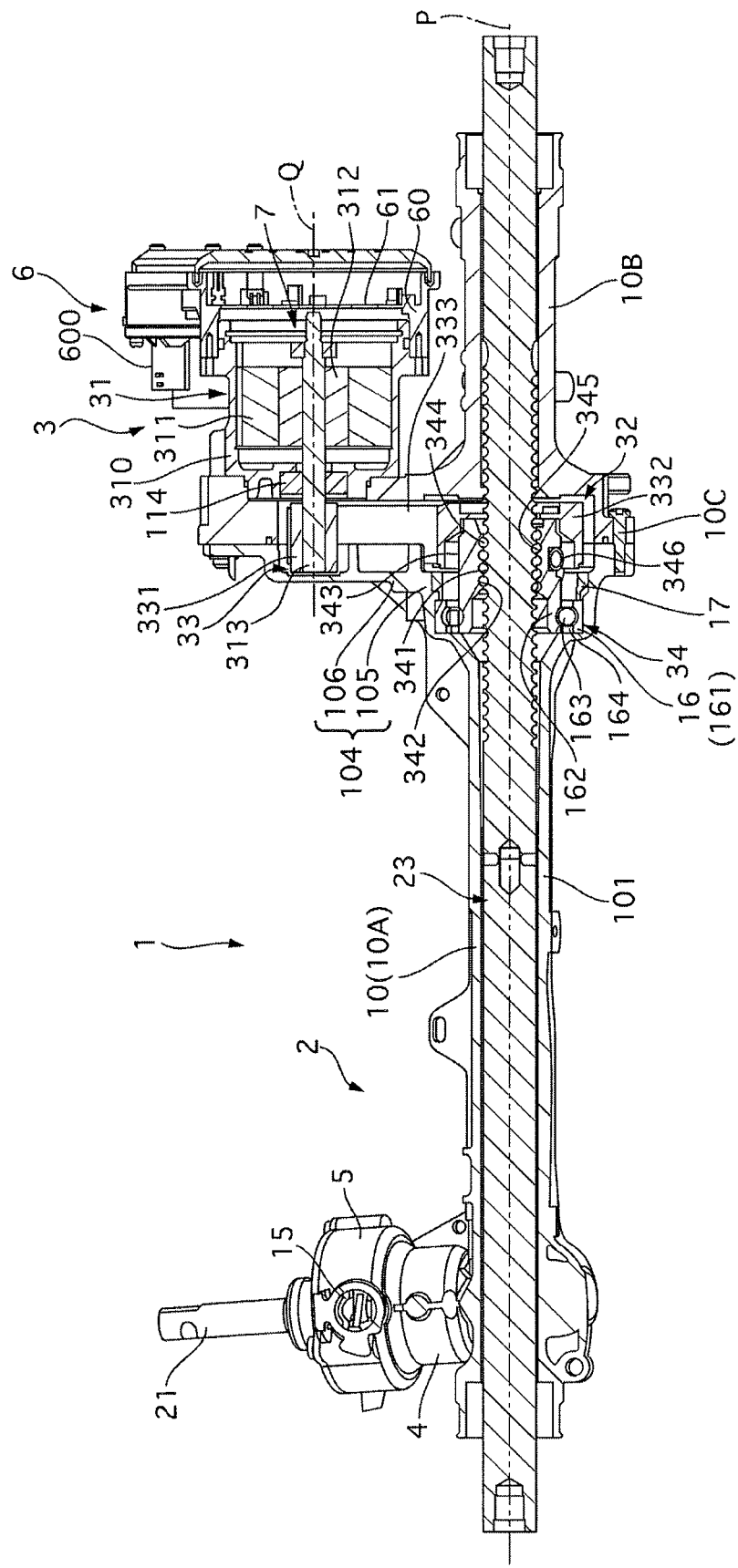
FIG. 4 is a cross-sectional view of the power steering apparatus according to the first embodiment, taken along a central axis of a rack shaft.

A power steering apparatus 1 (hereinafter referred to as an apparatus 1) according to the present embodiment will be described. First, a configuration thereof will be described. FIG. 1 is a perspective view of the apparatus 1. FIG. 2 is a front view of the apparatus 1. FIG. 3 is a cross-sectional view as viewed along a line III-III illustrated in FIG. 2. FIG. 4 is a cross-sectional view of the apparatus 1 taken along a central axis P of a rack shaft 23 and a central axis Q of an electric motor 31. The apparatus 1 is disposed in an engine room of an automobile, and provides assist power to a tuning target wheel. The apparatus 1 is an electrically driven (directly connected) power steering apparatus, and a rack assist-type power steering apparatus in which the electric motor 31 provides assist power to an axial movement of the rack shaft 23. The apparatus 1 includes a steering mechanism 2, an assist mechanism 3, a steering torque sensor 4, a steering angle sensor 5, and a control unit 6.

The steering mechanism 2 transmits a rotation of a steering wheel (a steering handle) operated by a driver to the turning target wheel. The steering mechanism 2 includes a steering shaft (a steering rod) 21, a pinion shaft 22, and the rack shaft 23. The steering shaft 21 is a steering input shaft coupled to the steering wheel. The steering shaft 21 rotates according to the rotation of the steering wheel with a rotational force from the steering wheel transmitted to the steering shaft 21. The steering shaft 21 functions as an operation mechanism of the steering apparatus together with the steering wheel. The pinion shaft 22 and the rack shaft 23 form a rack and pinion gear, and convert the rotational movement of the steering shaft 21 into a movement of the turning target wheel in an axle direction. Both the shafts 22 and 23 function as a gear mechanism of the steering apparatus. The pinon shaft 22 is a steering output shaft coupled to the steering shaft 21 via a torsion bar 24, and rotates integrally with the steering shaft 21 with a rotational force transmitted from the steering shaft 21 thereto. A pinion gear 220 is formed on an outer periphery of the pinion shaft 22. The rack shaft 23 is an axially movably provided rack bar. Rack teeth (a rack gear) 230 are formed on a part of an outer periphery of the rack shaft 23. The pinion gear 220 and the rack teeth 230 are meshed with each other. The turning target wheel is coupled to each of both axial ends of the rack shaft 23 via a rack end 231 or 232 as a link mechanism. The rack shaft 23 turns the turning target wheel by axially moving according to the rotation of the steering shaft 21 (the pinion shaft 22). The rack shaft 23 functions as a wheel turning shaft.

The assist mechanism 3 includes the electric motor 31 and a speed reducer 32. The electric motor 31 is an electrically-driven motor (electrically-powered motor), and, for example, a three-phase brushless DC motor is used therefor. As illustrated in FIG. 4, the electric motor 31 includes a stator 311 and a rotor 312. A rotational angle sensor 7 such as a resolver that detects a rotational angle or a rotational position of an output shaft 313 is provided on the output shaft 313 of the electric motor 31. The electric motor (hereinafter referred to as the motor) 31 is driven by electric power supplied from a power source (a battery) mounted on the vehicle, and three-phase currents are controlled by an inverter circuit 6n (a switching element). The motor 31 provides the assist force to the rack shaft 23 via the speed reducer 32.

The speed reducer 32 is provided between the steering mechanism 2 (the rack shaft 23) and the motor 31, and transmits an output of the motor 31 to the rack shaft 23 while slowing down a rotation of the output shaft 313 (amplifying a torque generated by the motor 31). The speed reducer 32 includes a belt movement transmission mechanism 33 and a ball screw mechanism 34. The belt movement transmission mechanism 33 includes an input pulley 331, an output pulley 332, and a belt 333. Both the pulleys 331 and 332 are cylindrical, and made from ferrous metallic materials. The input pulley 331 is fixed to the output shaft 313, and rotates integrally with the output shaft 313. The output pulley 332 is fixed to a nut 343 of the ball screw mechanism 34, and rotates integrally with the nut 343. The belt 333 is wound between the output pulley 332 and the input pulley 331. The ball screw mechanism 34 includes a first ball screw groove 341, a second ball screw groove 342, the nut 343, a plurality of balls 344, and a tube 346. The first ball screw groove 341 is provided on the rack shaft 23 side, and spirally extends around the central axis P on the outer periphery of the rack shaft 23 (a position axially spaced apart from a portion where the rack teeth 230 are formed). The nut 343 is annular, and is made from a ferrous metallic material. The second ball screw groove 342 is provided on the nut 343 side, and spirally extends around a central axis of the nut 343 on an inner periphery of the nut 343. The nut 343 is disposed so as to surround the rack shaft 23, and is provided rotatably relative to the rack shaft 23. A tubular ball circulation groove 345 is formed by both the grooves 341 and 342. The plurality of balls 344 is made from a ferrous metallic material, and is disposed in the ball circulation groove 345. The tube 346 is provided on an outer side of the nut 343 in a radial direction with respect to the central axis (a rotational axis) of the nut 343, and connects one end side and the other end side of the ball circulation groove 345.

A rotation of the output shaft 313 is converted into a rotation of the nut 343 via the input pulley 331, the belt 333, and the output pulley 332. When the nut 343 rotates, the balls 344 move inside the ball circulation groove 345, which causes the rack shaft 23 to axially move relative to the nut 343. The balls 344 can be circulated from the one end side to the other end side of the ball circulation groove 345 via the tube 346. The tube 346 functions as a member for circulating the balls 344 (a circulation member). In this manner, a driving force of the motor 31 is transmitted to the rack shaft 23 via the ball screw mechanism 34, by which an assist force (a steering assist force) is provided to a steering force of the driver.

The steering torque sensor 4 detects a torque (a steering torque T) input to the steering wheel by a steering operation performed by the driver and generated on the steering mechanism 2. As illustrated in FIG. 3, the steering torque sensor 4 is provided between the steering shaft 21 and the pinion shaft 22, and includes a first rotational angle sensor 41 and a second rotational angle sensor 42. The first rotational angle sensor 41 detects a rotational angle of the steering shaft 21. More specifically, the first rotational angle sensor 41 includes a magnet and a Hall element (a Hall IC), and outputs a change in a magnetic field changing according to a rotational position of the steering shaft 21 as an electric signal (a sine-wave signal of a voltage). Similarly, the second rotational angle sensor 42 detects a rotational angle of the pinion shaft 22, and outputs it as an electric signal. These electric signals are output to a control unit (hereinafter referred to as an ECU) 6 via a connector portion 15.

The steering angle sensor 5 detects a rotational angle of the steering wheel (the steering shaft 21), i.e., a steering absolute angle (a steering angle θ). The steering angle sensor 5 is provided on the steering shaft 21. More specifically, the steering angle sensor 5 includes an input gear 50, a first gear 51 and a second gear 52, and magnetoresistance effect sensors. The input gear 50 is a larger gear. The first gear 51 and the second gear 52 are small gears, and have the number of teeth undividable by each other. The input gear 50 rotates integrally with the steering shaft 21, and the first gear 51 and the second gear 52 are meshed with the input gear 50 and the first gear 51, respectively. A magnetic member is attached to each of the first and second gears 51 and 52, and the magnetic member is magnetized so as to have a north pole and a south pole circumferentially arranged thereon. A substrate 53 is disposed so as to face the first and second gears 51 and 52. The magnetoresistance effect sensors are installed on the substrate 53 at each of positions facing the magnetic members. Each of the magnetoresistance effect sensors detects a rotational angle of the gear 51 or 52 that it faces. More specifically, the magnetoresistance effect sensor facing the first gear 52 outputs a change in magnetic resistance changing according to a rotational position of the first gear 51 as an electric signal (a sine-wave signal of a voltage). Similarly, the magnetoresistance effect sensor facing the second gear 52 detects the rotational angle of the second gear 52, and outputs it as an electric signal. These electric signals are output to the ECU 6 via the connector portion 15.

The ECU 6 is an electronic control unit (a microcomputer) functioning as a controller of the apparatus 1, and can perform assist control by controlling the motor 31. The ECU 6 is electrically connected to the motor 31 (the rotational angle sensor 7), the steering torque sensor 4, the steering angle sensor 5, and a display apparatus 8 (refer to FIG. 5). The ECU 6 is also connected to another sensor and controller via a CAN communication line, and can receive signals from them. The ECU 6 includes a case 60, a substrate 61, and electronic parts. The electronic parts are provided to, for example, control driving of the motor 31, and include a power source relay, the inverter circuit 6n, and the like. The inverter circuit 6n converts direct-current electric power supplied from the battery into alternating-current electric power, and supplies the converted electric power to the motor 31. The electronic parts are mounted on the substrate 61. The case 60 is made from resin, and contains the substrate 62 therein. A connector portion 600 is provided to the case 60. A terminal electrically connected to the substrate 61 is provided to the connector portion 600. A harness for a connection to the steering torque sensor 4 or the like is connected to the connector portion 600. When the steering wheel is steered by the driver, the steering torque T is detected by the steering torque sensor 4. The detected torque signal is output to the ECU 6. The ECU 6 calculates a target steering assist force based on information such as the inputted steering torque T, and outputs a drive signal to the motor 31 based on a signal such as this target steering assist force and an inputted motor rotational position. The ECU 6 controls the output of the motor 31 by controlling the current flowing to the motor 31, by which appropriate assist power is provided to the rack shaft 23 and the steering force of the driver is assisted.

The steering mechanism 2 and the speed reducer 32 are installed in a gear housing 10, and the motor 31 is installed in a motor housing 310. These housings 10 and 310 are made from aluminum-based metallic materials. The gear housing 10 may be made from a ferrous metallic material. The gear housing 10 includes a first housing 10A and a second housing 10B. The first and second housings 10A and 10B are integrally fixed with use of a bolt 10C. The gear housing 10 includes a rack shaft containing portion 101, a gear containing portion 102, a sensor containing portion 103, and a speed reducer containing portion 104. The rack shaft containing portion 101 is cylindrical, and is opened at axial both ends thereof. An inner peripheral surface of the rack shaft containing portion 101 is cylindrical, and a diameter thereof is slightly larger than a diameter of the rack shaft 23. The rack shaft containing portion 101 is a rack tube containing the rack shaft 23 therein. The rack shaft 23 is placed so as to penetrate through the rack shaft containing portion 101, and both ends of the rack shaft 23 are exposed from the gear housing 10 (the rack shaft containing portion 101). The rack ends 231 and 232 are coupled to both the axial ends of the rack shaft 23, respectively. As illustrated in FIG. 1, dust boots 233 and 234 are attached to both ends of the rack shaft containing portion 101 so as to cover portions where the rack shaft 23 and the rack ends 231 and 232 are coupled with each other, respectively. The dust boots 233 and 234 are bellows-like members, and are made from rubber materials. The dust boots 233 and 234 have a function of preventing a foreign object such as water from entering the gear housing 10 from the opening portions at both the axial ends of the rack shaft containing portion 101 by passing through a space between the inner peripheral surface of the rack shaft containing portion 101 and the outer peripheral surface of the rack shaft 23.

The gear containing portion 102 and the sensor containing portion 103 are provided at an end portion of the rack shaft containing portion 101 on one axial side, and extend radially with respect to the central axis P of the inner peripheral surface of the rack shaft containing portion 101. As illustrated in FIG. 3, the gear containing portion 102 partially overlaps the rack shaft containing portion 101. An inner peripheral surface of the gear containing portion 102 has a bottomed cylindrical shape, and a part thereof is opened to the inner peripheral surface of the rack shaft containing portion 101. The gear containing portion 102 contains therein one end side of the pinion shaft 22 where the pinion gear 220 is provided, and a part of the portion of the rack shaft 23 where the rack teeth 230 are provided. The above-described one end side of the pinion shaft 22 is supported on a bottom portion side of the inner peripheral surface of the gear containing portion 102 via a needle bearing 111. A coil spring 12 and a retainer 13 are provided on the rack shaft containing portion 101 at a portion (the above-described one end side of the pinion shaft 22) facing the gear containing portion 102 via the rack shaft 23. The coil spring 12 presses the rack teeth 230 against the pinion gear 220 by biasing the retainer 13 toward the rack shaft 23.

An inner peripheral surface of the sensor containing portion 103 has a stepped cylindrical shape extending generally coaxially with the inner peripheral surface of the gear containing portion 102. One axial end side of the inner peripheral surface of the sensor containing portion 103 is continuous to the inner peripheral surface of the gear containing portion 102, and an opening of the sensor containing portion 103 on the other axial end side is closed by a cover member 14. The sensor containing portion 103 contains therein a part of the steering shaft 21, the other end side of the pinion shaft 22, the steering torque sensor 4, and the steering angle sensor 5. The other end side of the pinion shaft 22 is supported on the inner peripheral surface of the sensor containing portion 103 via a ball bearing 112. The steering shaft 21 penetrates through the cover member 14 and extends generally coaxially with the pinion shaft 22. The steering shaft 21 is supported by the cover member 14 via a needle bearing 113, and one end side of the steering shaft 21 is rotatably fitted to a recessed portion 221 on the above-described other end side of the pinion shaft 22. The steering shaft 21 includes a bottomed axial hole 211 opened to the above-described one end side, and a torsion bar 24 is placed in this axial hole 211. One end side of the torsion bar 24 is fixed to the steering shaft 21 via a pin 241, and the other end side of the torsion bar 24 is fixed to the above-described other end side of the pinion shaft 22 by being press-fitted. The steering torque sensor 4 and the steering angle sensor 5 are installed around the steering shaft 21 in the sensor containing portion 103. The steering torque sensor 4 is disposed on one side closer to the gear containing portion 102 and the steering angle sensor 5 (the substrate 53 and the like) is disposed on the other side closer to the cover member 14 in an axial direction of the sensor containing portion 103. The connector portion 15 is provided on an outer peripheral surface of the sensor containing portion 103. The connector portion 15 is connected to the steering torque sensor 4 and the steering angle sensor 5 via terminals. A harness for a connection to the ECU 6 is connected to the connector portion 15.

The speed reducer containing portion 104 is provided in a flange-like manner on the other axial side of the rack shaft containing portion 101, and extends radially outward with respect to the central axis P. The speed reducer containing portion 104 includes a ball screw mechanism containing portion 105 and a belt movement transmission mechanism containing portion 106, and contains the speed reducer 32 therein. These containing portions 105 and 106 partially overlap each other. As illustrated in FIG. 4, an inner peripheral surface of the ball screw mechanism containing portion 105 has a cylindrical shape extending generally coaxially with the inner peripheral side of the rack shaft containing portion 101. One axial end side of the inner peripheral surface of the ball screw mechanism containing portion 105 is continuous to the inner peripheral surface of the rack shaft containing portion 101 of the first housing 10A, and the other axial end side thereof is continuous to the inner peripheral surface of the rack shaft containing portion 101 of the second housing 10B. The ball screw mechanism containing portion 105 contains the ball screw mechanism 34 therein. One axial end side of the nut 343 is supported on the inner peripheral surface of the ball screw mechanism containing portion 105 via a bearing 16. The bearing 16 pivotally supports the nut 343 rotatably relative to the gear housing 10. The bearing 16 is a ball bearing, and includes an outer race 161, an inner race 162, balls 163, and a cage 164.

The inner race 162 is provided integrally with the above-described one axial end side of the nut 343. The cage 162 allows the balls 163 to be disposed between the inner race 162 and the outer race 161 at generally even intervals. An annular lock ring 17 is placed in the ball screw mechanism containing portion 105. The outer race 161 is sandwiched between the inner peripheral surface of the ball screw mechanism containing portion 105 and the lock ring 17, by which an axial movement of the outer race 161 is restricted.

The belt movement transmission mechanism containing portion 160 extends radially outward from the ball screw mechanism containing portion 105. One axial end side of the motor housing 310 is fixed to a radially outer side of the speed reducer containing portion 104. A radially inner side and a radially outer side of an inner peripheral surface of the belt movement transmission mechanism containing portion 106 are continuous to the inner peripheral surface of the ball screw mechanism containing portion 105 and the inner peripheral surface of the motor housing 310, respectively. The belt movement transmission containing portion 106 contains the belt movement transmission mechanism 33 therein. One end side of the output shaft 313 of the motor 31 is contained in the inner peripheral side of the belt movement transmission mechanism containing portion 106 while protruding generally in parallel with the rack shaft 23 (the central axis P). The input pulley 331 is fixed to an outer periphery of the above-described protruding portion of the output shaft 313. The output pulley 332 is fixed to an outer periphery of the other axial end side of the nut 343. The belt 333 wound around both the pulleys 331 and 332 extends generally in parallel with the output shaft 313 and the rack shaft 23, and is contained in the belt movement transmission mechanism containing portion 106.

The motor housing 310 has a bottomed cylindrical shape, and the stator 311 is fixed to an inner peripheral surface thereof. The output shaft 313 is supported by the motor housing 310 via a bearing 114. The rotor 312 is fixed to the output shaft 313, and disposed on an inner peripheral side of the stator 311. The case 60 of the ECU 6 is fixed to the other axial end side (an opening portion) of the motor housing 310. The substrate 61 extends in a direction generally orthogonal to the output shaft 313. The substrate 61 is connected to the stator 311 via a terminal.

Figure 5:
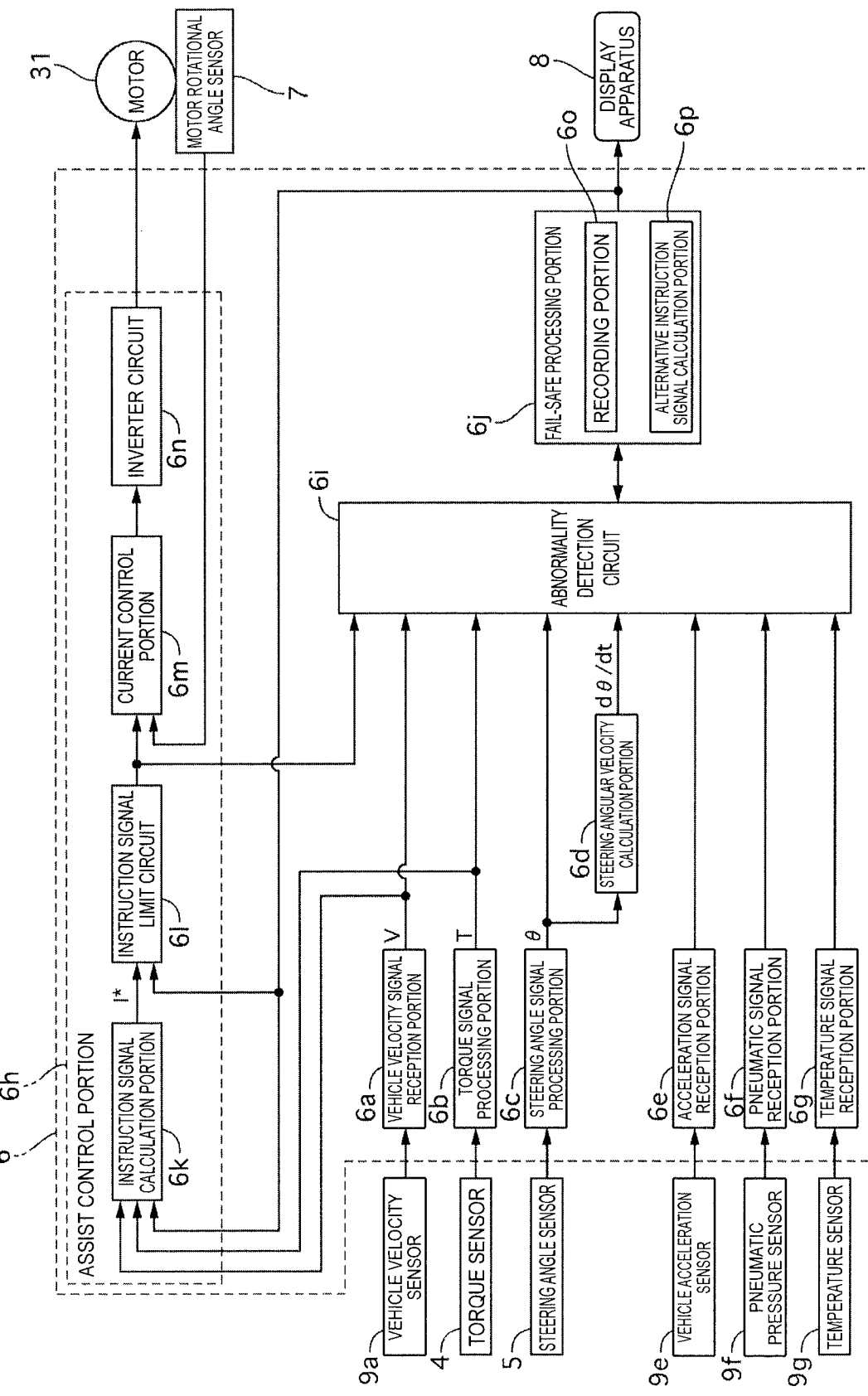
FIG. 5 illustrates a control system according to the first embodiment.

FIG. 5 is a block diagram illustrating a control system of the apparatus 1. The ECU 6 includes a vehicle velocity signal reception portion 6a, a torque signal processing portion 6b, a steering angle signal processing portion 6c, a steering angular velocity calculation portion 6d, an acceleration signal reception portion 6e, a pneumatic signal reception portion 6f, a temperature signal reception portion 6g, an assist control portion 6h, an abnormality detection circuit 6i, and a fail-safe processing portion 6j. The vehicle velocity signal reception portion 6a receives a vehicle velocity signal detected by a vehicle velocity sensor 9a via the CAN. The torque signal processing portion 6b receives a rotational angle signal of the steering shaft 21 and a rotational angle signal of the pinon shaft 22 that are detected by the steering torque sensor 4 (the first and second rotational angle sensors 41 and 42), and processes them to generate a torque signal. When the torsion bar 24 is twisted due to the steering torque T, a rotational angle difference is generated between both the shafts 21 and 22. The torque signal processing portion 6b calculates T by multiplying the difference between the rotational angles detected by the respective sensors 41 and 42 by a Young's modulus of the torsion bar 24. The torque signal processing portion 6b carries out a noise removal and phase compensation as necessary. The torque signal processing portion 6b substantially functions as a torque signal reception portion configured to receive a torque signal. The ECU 6 may be configured to receive and introduce the steering torque signal instead of calculating the steering torque signal by the ECU 6 itself.

The steering angle signal processing portion 6c receives a rotational angle signal of the first gear 51 and a rotational angle signal of the second gear 52 that are detected by the steering angle sensor 5 (the respective magnetoresistance effect sensors), and processes them to generate a steering angle signal. When the steering shaft 21 rotates, a rotational angle difference is generated between the first and second gears 51 and 52. The steering angle signal processing portion 6c calculates the rotational angle of the steering shaft 21, i.e., the steering angle θ with use of the difference between the rotational angles detected by the respective magnetoresistance effect sensors. The steering angle signal processing portion 6c substantially functions as a steering angle signal reception portion configured to receive a steering angle signal. The ECU 6 may be configured to receive and introduce the steering angle signal instead of calculating the steering angle signal by the ECU 6 itself. The steering angular velocity calculation portion 6d calculates a steering angular velocity dθ/dt based on the calculated steering angle θ. The steering angular velocity calculation portion 6d substantially functions as a steering angular velocity signal reception portion configured to receive a steering angular velocity signal. The ECU 6 may be configured to receive and introduce the steering angular velocity signal instead of calculating the steering angular velocity signal by the ECU 6 itself.

The acceleration signal reception portion 6e receives a gravitational (G) acceleration signal of the vehicle that is detected by a vehicle acceleration sensor 9e via the CAN. The vehicle acceleration signal may be a signal output from the acceleration sensor 9e in this manner or may be calculated by the ECU 6 based on the vehicle velocity V and the steering angle θ. The pneumatic signal reception portion 6f receives, via the CAN, a pneumatic signal of a tire of the turning target wheel that is detected by a pneumatic sensor 9f. The temperature signal reception portion 6g receives, via the CAN, an ambient temperature signal detected by a temperature sensor 9g. The ambient temperature is, for example, an atmospheric temperature and represents a temperature around the apparatus 1 (the steering mechanism 2).

Figure 6:
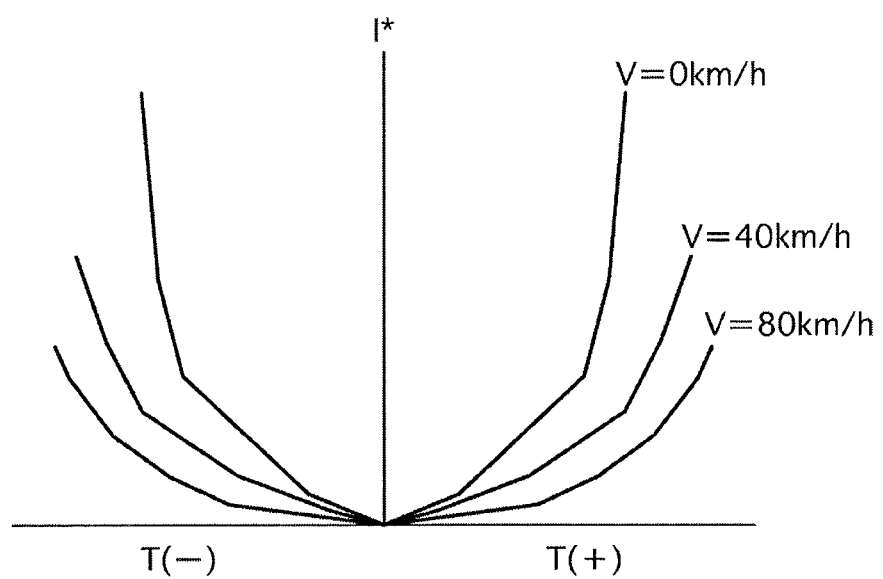
FIG. 6 illustrates a relationship between a steering torque and a motor current instruction value according to the first embodiment.

The assist control portion 6h includes an instruction signal calculation portion 6k, an instruction signal limit circuit 6l, a current control portion 6m, and the inverter circuit 6n. The instruction signal calculation portion 6k calculates an instruction signal for controlling the driving of the motor 31, based on the steering torque T. More specifically, the instruction signal calculation portion 6k calculates a current instruction value I* as a torque instruction value directed to the motor 31, based on T and the vehicle velocity V. For example, the instruction signal calculation portion 6k acquires I* with use of a map having a characteristic like an example illustrated in FIG. 6. The instruction signal calculation portion 6k increases I* as T increases in each wheel turning direction (positive and negative directions of T). The instruction signal calculation portion 6k increases I* by a larger amount with respect to an increase in T when T is large than when T is small. The instruction signal calculation portion 6k reduces I* as V increases. The instruction signal calculation portion 6k reduces I* by a smaller amount with respect to an increase in V when V is high than when V is low. The instruction signal calculation portion 6k may be configured to correct I* acquired based on T, regardless of V according to another driving state of the vehicle. Alternatively, the instruction signal calculation portion 6k may realize I* having the above-described characteristic by a calculation. Further, the instruction signal is not limited to a signal regarding the current value, and may be a signal regarding the torque. The instruction signal limit circuit 61 limits the above-described instruction signal according to a limit instruction signal. The above-described limit instruction signal may be a signal regarding an abnormality detected by the ECU 6 (the abnormality detection circuit 6i or the like) or may be a signal output from an apparatus other than the apparatus 1 and received via the CAN. For example, upon detection of overheating of the motor 31 or the inverter circuit 6n or the like, the instruction signal limit circuit 1 limits the value of I* to a predetermined upper limit value or smaller. A limit amount can be set to a value according to, for example, a temperature of the motor 31 or the like.

The current control portion 6m and the inverter circuit 6n function as a supply portion configured to supply drive electric power for the motor 31. The current control portion 6m detects a value of the current flowing to the motor 31, and calculates such a voltage instruction value that this current detection value matches the above-described current instruction value I* (acquired as three-phase current instruction values in a case where alternating-current control is performed, and acquired as current instruction values of the d-axis and the q-axis in a case where vector control is performed). Further, the current control portion 6m detects a rotational angle (the rotational position) of the motor 31, and calculates three-phase target current values of the motor 31 from this rotational angle and the voltage instruction value. The inverter circuit 6n converts a direct-current voltage of the battery into three-phase alternating-current voltages and supplies them to three-phase coils of the motor 31 (the stator 311) by generating a pulse width modulation signal according to the three-phase target voltage values to cause the switching element (an FET or the like) to operate.

The abnormality detection circuit 6i carries out detection of an abnormality in the apparatus 1 based on the steering torque T or the like. More specifically, the abnormality detection circuit 6i detects deterioration of an operation of the steering mechanism 2 including the assist mechanism 3, and a reduction in detection accuracy of the steering torque sensor 4 and the steering sensor 5. The fail-safe processing portion 6j performs processing (fail-safe processing) in a direction further safe for the driver when the abnormality in the apparatus 1 is detected. More specifically, when the deterioration of the operation of the steering mechanism 2 including the assist mechanism 3 is detected, the fail-safe processing portion 6j notifies the driver thereof with use of the display apparatus 8 of the vehicle or the like and/or stops the assist control. Further, when the reduction in the detection accuracy of one of the sensors 4 and 5 is detected, the fail-safe processing portion 6j continues the assist control with use of the detection value of the other sensor and/or notifies the driver of the reduction in the detection accuracy. The fail-safe processing portion 6j includes a recording portion 6o and an alternative instruction signal calculation portion 6p. When the deterioration of the operation of the steering mechanism 2 including the assist mechanism 3 is detected and this (the abnormality) is determined, the recording portion 6o records that (the decision of the abnormality). For example, when the reduction in the detection accuracy of the steering torque sensor 4 is detected, the alternative instruction signal calculation portion 6p calculates the above-described instruction signal based on the detection value of the steering angle sensor 5 (and the vehicle velocity V or the like). The above-described instruction signal can be calculated based on the steering angle θ or the steering angular velocity dθ/dt, or both of them. The assist control portion 6h continues the assist control by controlling the driving of the motor 31 with use of the instruction signal calculated by the alternative instruction signal calculation portion 6p (an alternative instruction signal) rather than the instruction signal calculation portion 6k.

Figure 7:
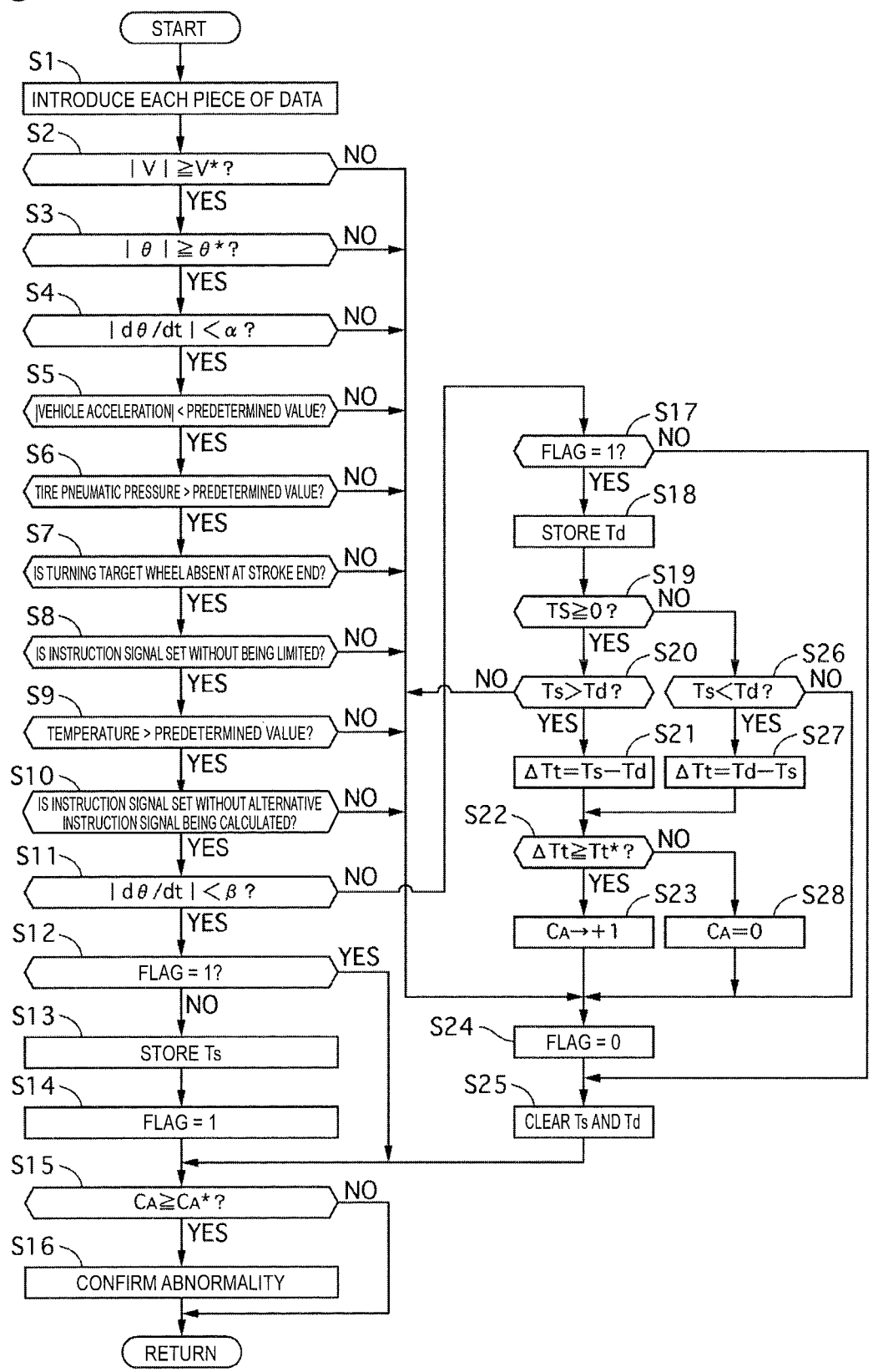
FIG. 7 illustrates a flow of abnormality detection processing according to the first embodiment.

FIG. 7 illustrates a flow of control for detecting the abnormality (the deterioration of the operation of the steering mechanism 2 including the assist mechanism 3) that is performed by the abnormality detection circuit 6i. This flow is repeatedly performed per predetermined cycle (for example, 1 ms). In step S1 (hereinafter, a step will be abbreviated as S), the abnormality detection circuit 6i introduces each piece of data (the vehicle velocity V, the steering torque T, the steering angle θ, the steering angular velocity dθ/dt, the vehicle acceleration, the pneumatic pressure, the ambient temperature, whether the instruction signal is limited, and whether the alternative instruction signal is used). Then, the processing proceeds to S2. In S2, the abnormality detection circuit 6i determines whether a value |V| of V is a predetermined value V* (for example, 15 km/h) or larger. If |V| is V* or larger, the processing proceeds to S3. If |V| is smaller than V*, the processing proceeds to S24. In S3, the abnormality detection circuit 6i determines whether a value |θ| of the steering angle θ is a predetermined value θ* (for example, 10 degrees) or larger. If |θ| is θ* or larger, the processing proceeds to S4. If |θ| is smaller than θ*, the processing proceeds to S24. In S4, the abnormality detection circuit 6i determines whether a value |dθ/dt| of the steering angular velocity dθ/dt is smaller than a predetermined value α. If |dθ/dt| is smaller than α, the processing proceeds to S5. If |dθ/dt| is α or larger, the processing proceeds to S24. In S5, the abnormality detection circuit 6i determines whether a value of the vehicle acceleration is smaller than a predetermined value. If the value of the vehicle acceleration is smaller than the predetermined value, the processing proceeds to S6. If the value of the vehicle acceleration is the predetermined value or larger, the processing proceeds to S24. In S6, the abnormality detection circuit 6i determines whether the pneumatic pressure of the tire of the turning target wheel is higher than a predetermined value. If the pneumatic pressure is higher than the predetermined value, the processing proceeds to S7. If the pneumatic pressure is the predetermined value or lower, the processing proceeds to S24. In S7, the abnormality detection circuit 6i determines, based on θ, whether the turning target wheel is not located at a stroke end (a limit position in a range where the turning target wheel is movable), i.e., whether the rack shaft 23 is not located at a stroke end (a limit position in a range where the rack shaft 23 is movable). If the turning target wheel is not located at the stroke end, the processing proceeds to S8. If the turning target wheel is located at the stroke end, the processing proceeds to S24. In S8, the abnormality detection circuit 6i determines whether the instruction signal is not limited. If the instruction signal is not limited, the processing proceeds to S9. If the instruction signal is limited, the processing proceeds to S24. In S9, the abnormality detection circuit 6i determines whether the ambient temperature is higher than a predetermined value. If the ambient temperature is higher than the predetermined value, the processing proceeds to S10. If the ambient temperature is the predetermined value or lower, the processing proceeds to S24.

In S10, the abnormality detection circuit 6*i* determines whether the alternative instruction signal is not calculated. If the alternative instruction signal is not calculated, the processing proceeds to S11. If the alternative instruction signal is calculated, the processing proceeds to S24. In S11, the abnormality detection circuit 6*i* determines whether |dθ/dt| is smaller than a predetermined threshold value β (for example, 5 deg/sec). If |dθ/dt| is smaller than β, the processing proceeds to S12. If |dθ/dt| is β or larger, the processing proceeds to S17. In S12, the abnormality detection circuit 6*i* determines whether a flag is set to 1. If the flag is not set to 1, the processing proceeds to S13. If the flag is set to 1, the processing proceeds to S15. In S13, the abnormality detection circuit 6*i* stores a steering torque Ts as of this moment (introduced in S1 in the present cycle). Then, the processing proceeds to S14. In S14, the abnormality detection circuit 6*i* sets the flag to 1. Then, the processing proceeds to S15. In S15, the abnormality detection circuit 6*i* determines whether an abnormality determination counter $C_A$ is a predetermined value $C_A^*$ (for example, 5) or larger. If $C_A$ is $C_A^*$ or larger, the processing proceeds to S16. If $C_A$ is smaller than $C_A^*$, the abnormality detection circuit 6*i* ends the present cycle. In S16, the abnormality detection circuit 6*i* decides the abnormality, and then ends the present cycle. In S17, the abnormality detection circuit 6*i* determines whether the flag is set to 1. If the flag is set to 1, the processing proceeds to S18. If the flag is not set to 1, the processing proceeds to S25. In S18, the abnormality detection circuit 6*i* stores a steering torque Td as of this moment (introduced in S1 in the present cycle). Then, the processing proceeds to S19. In S19, the abnormality detection circuit 6*i* determines whether the stored steering torque Ts is 0 or larger. If Ts is 0 or larger, the processing proceeds to S20. If Ts is smaller than 0, the processing proceeds to S26. In S20, the abnormality detection circuit 6*i* determines whether Ts is larger than Td. If Ts is larger than Td, the processing proceeds to S21. If Ts is Td or smaller, the processing proceeds to S24. In S21, the abnormality detection circuit 6*i* subtracts Td from Ts to acquire a difference value ΔTt as the change amount of the steering torque T. After that, the processing proceeds to S22. In S22, the abnormality detection circuit 6*i* determines whether ΔTt is a predetermined value ΔTt* (for example, 1 Nm) or larger. If ΔTt is ΔTt* or larger, the processing proceeds to S23. If ΔTt is smaller than ΔTt*, the processing proceeds to S28. In S23, the abnormality detection circuit 6*i* adds 1 to $C_A$ (increments $C_A$). Then, the processing proceeds to S24. In S24, the abnormality detection circuit 6*i* sets the flag to 0. Then, the processing proceeds to S25. In S25, the abnormality detection circuit 6*i* clears Ts and Td (deletes Ts and Td from the storage). Then, the processing proceeds to S15. In S26, the abnormality detection circuit 6*i* determines whether Ts is smaller than Td. If Ts is smaller than Td, the processing proceeds to S27. If Ts is Td or larger, the processing proceeds to S24. In S27, the abnormality detection circuit 6*i* subtracts Ts from Td to acquire ΔTt. After that, the processing proceeds to S22. In S28, the abnormality detection circuit 6*i* sets $C_A$ to 0. Then, the processing proceeds to S24.

Figure 8:
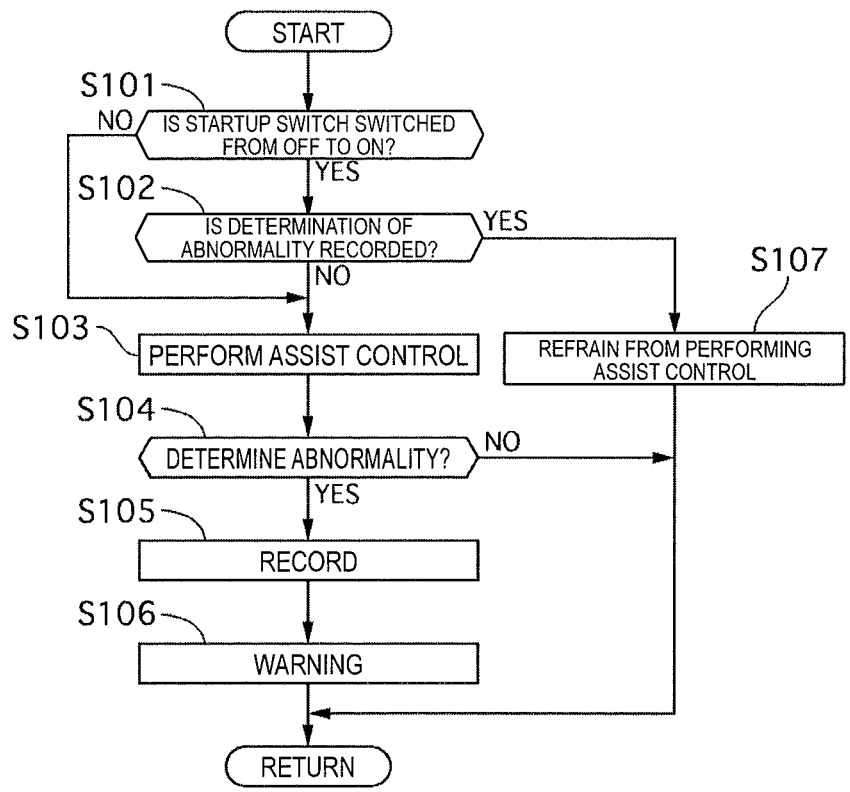
FIG. 8 illustrates a flow of fail-safe control according to the first embodiment.

FIG. 8 illustrates a flow of the fail-safe processing when the abnormality (the deterioration of the operation of the steering mechanism 2 including the assist mechanism 3) is detected, which is performed by the fail-safe processing portion 6*j*. This flow is repeatedly performed per predetermined cycle (for example, 1 ms). In S101, the fail-safe processing portion 6*j* determines whether a startup switch of the vehicle is switched from OFF to ON. If the startup switch is switched from OFF to ON, the processing proceeds to S102. If the startup switch is kept at ON, the processing proceeds to S103. In S102, the fail-safe processing portion 6*j* determines whether the decision of the abnormality is recorded by the recording portion 6*o*. If the decision of the abnormality is recorded, the processing proceeds to S107. If the decision of the abnormality is not recorded, the processing proceeds to S103. In S103, the fail-safe processing portion 6*j* allows the assist control to be performed. More specifically, the fail-safe processing portion 6*j* permits the instruction signal calculation portion 6*k* to calculate the instruction signal. After that, the processing proceeds to S104. In S104, the fail-safe processing portion 6*j* determines whether the abnormality is decided by the abnormality detection circuit 6*i*. If the abnormality is decided, the processing proceeds to S105. If the abnormality is not decided, the fail-safe processing portion 6*j* ends the present cycle. In S105, the fail-safe processing portion 6*j* records the decision of the abnormality by the recording portion 6*o*. Then, the processing proceeds to S106. In S106, the fail-safe processing portion 6*j* warns the driver by displaying the occurrence of the abnormality on the display apparatus 8, and then ends the present cycle. In S107, the fail-safe processing portion 6*j* prohibits the execution of the assist control. More specifically, the fail-safe processing portion 6*j* prohibits the instruction signal calculation portion 6*k* from calculating the instruction signal. After that, the fail-safe processing portion 6*j* ends the present cycle.

Advantageous Effects

Next, advantageous effects will be described.
(Abnormality Detection Processing)

Figure 9:
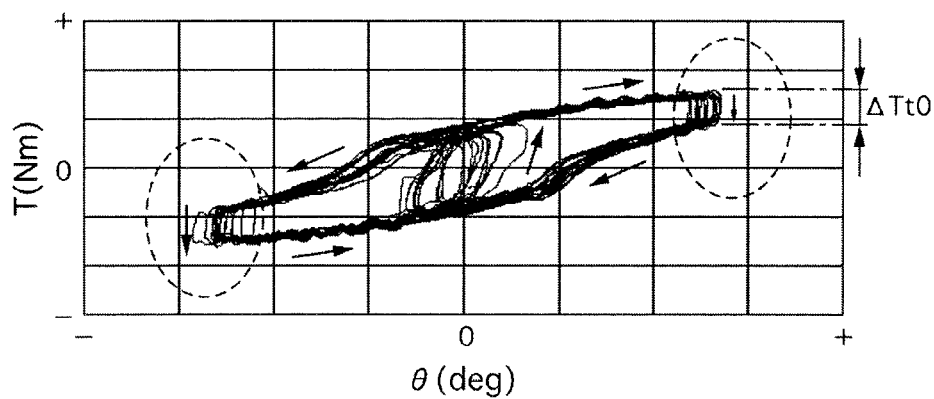
FIG. 9 illustrates a relationship between a steering angle and the steering torque on the first day of an experiment according to the first embodiment.
Figure 10:
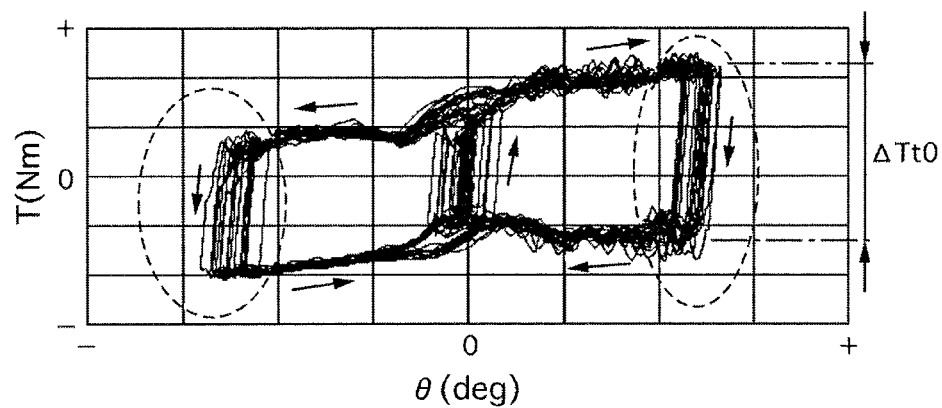
FIG. 10 illustrates a relationship between the steering angle and the steering torque on the third day of the experiment according to the first embodiment.

The present inventors conducted an experiment of running a vehicle at 40 km/h with the dust boots 233 and 234 cut and salty/muddy water injected into the gear housing 10, and measuring a steering state day by day. FIG. 9 illustrates a steering angle-steering torque characteristic on the first day immediately after the injection of the salty/muddy water. FIG. 10 illustrates the above-described characteristic three days after the injection of the salty/muddy water. Arrows indicate directions in which the steering angle θ and the steering torque T were changed by the steering operation. When the vehicle was steered in an opposite direction, by which the steering direction was switched (i.e., in a region where the steering direction was switched, which is indicated by being surrounded by a broken line), T was changed (a hysteresis characteristic). A change amount ΔTt0 of this T was small on the first day but was large three days after that. It is considered that this is because friction of the steering mechanism 2 including the speed reducer 32 (the ball screw mechanism 34) increased according to development of rust due to the salty/muddy water and the movement thereof had unsmooth progress (was dulled). In other words, the unsmooth progress prohibited the steering from being smoothly returned and caused the steering to be stuck. After three days, a (plus or minus) sign of T was changed between before and after T was changed when the vehicle was steered in the opposite direction. This means that the steering wheel became unable to be automatically returned to a neutral side even if the driver took his/her hand off from the steering wheel when steering the vehicle in the opposite direction, raising a necessity for the driver to return the steering wheel to the neutral side by his/her hand. It is revealed that T is noticeably changed in the region where the steering direction is switched if an abnormality has occurred in the apparatus 1 and a normal steering operation become unable to be performed due to the stuck steering in this manner.

Figure 11:
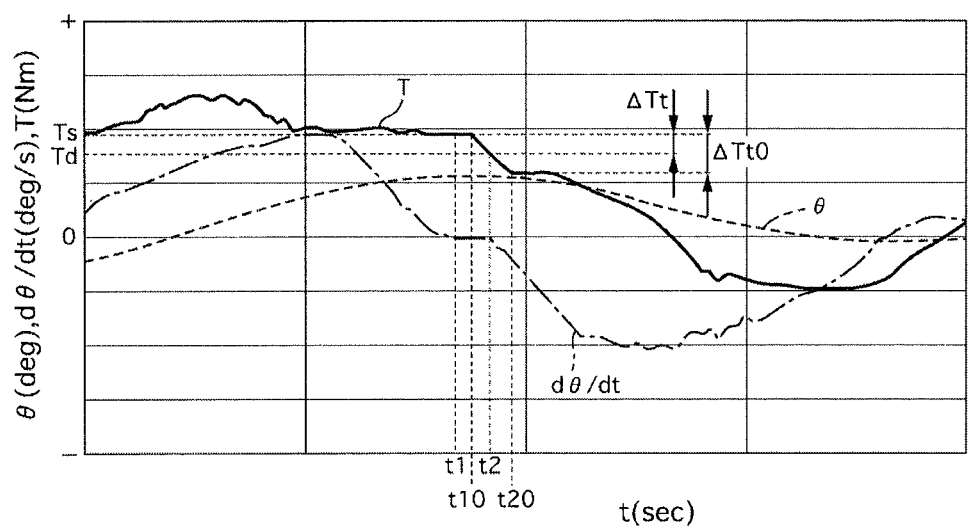
FIG. 11 illustrates changes in the steering angle, a steering angular velocity, and the steering torque over time on the first day of the experiment according to the first embodiment.
Figure 12:
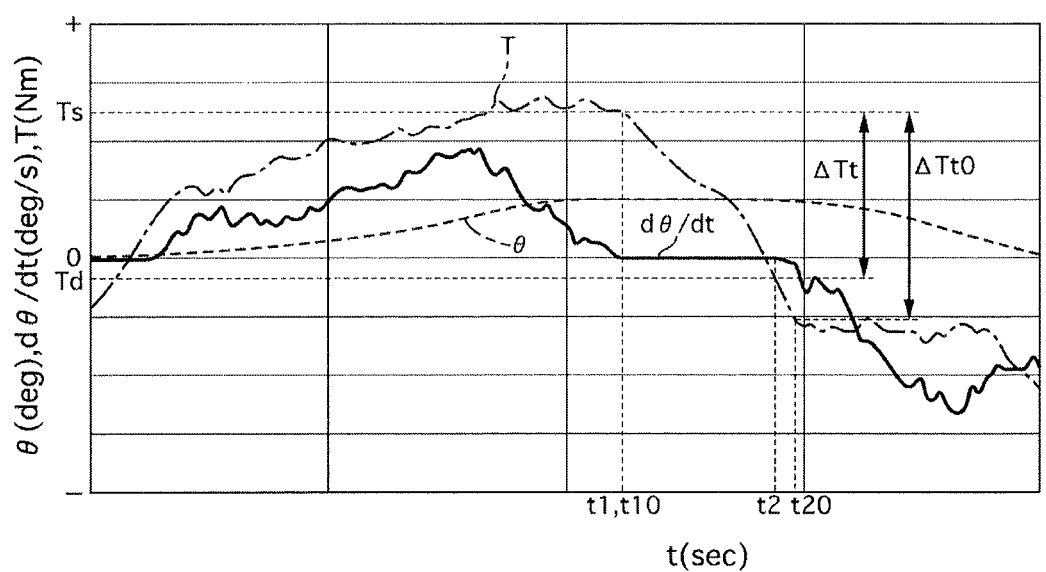
FIG. 12 illustrates changes in the steering angle, the steering angular velocity, and the steering torque over time on the third day of the experiment according to the first embodiment.

FIG. 11 illustrates changes in the steering angle θ, the steering angular velocity dθ/dt, and the steering torque T over time on the first day immediately after the injection of the salty/muddy water. FIG. 12 illustrates the above-described changes over time three days after the injection of the salty/muddy water. When the vehicle was steered in the opposite direction, a sign of dθ/dt was switched from one of the plus sign and the minus sign to the other of them and T was also changed. More specifically, at time t1, dθ/dt shifted from a state in which the sign of dθ/dt was (constantly) one of the plus sign and the minus sign to a state in which the sign of dθ/dt was kept in a predetermined region including 0 (around 0). This is referred to as a steering holding state. At time t2, dθ/dt was switched from the steering holding state to the state in which the sign of dθ/dt was (constantly) one of the plus sign and the minus sign. This is referred to as a steering return state.

A time period from t1 to t2 during which the steering holding state continued and a time period from t10 to t20 during which T was changed overlap each other. The change amount ΔTt0 of T when the vehicle was steered in the opposite direction can be approximated by the change amount ΔTt (=|Ts−Td|) of T during the steering holding state (t1 to t2). A time length of the steering holding state (t2−t1) was long and ΔTt was large after three days compared to that on the first day. This means that, even if the driver largely changed T input to the steering wheel when steering the vehicle in the opposite direction, the steering did not easily shift from the steering holding state to the steering return state and the steering wheel did not easily return to the neutral side (took a long time to return to the neutral side), i.e., the stuck steering had occurred.

The prevent inventors have focused on the fact that the stuck steering occurs when the vehicle is steered in the opposite direction at the time of the occurrence of the abnormality in the apparatus 1, and have configured the abnormality detection circuit 6i to carry out the detection of the abnormality in the apparatus 1 based on the change in T in the steering holding state when the vehicle is steered in the opposite direction. More specifically, the abnormality detection circuit 6i carries out the detection of the abnormality in the apparatus 1 based on the change in the steering torque T in a predetermined region of dθ/dt (a region of ±β serving as the threshold value across 0, i.e., −β<dθ/dt<β) including the region where the sign of dθ/dt is switched (the region where dθ/dt has the value of 0). The state in which dθ/dt is located in the region of −β<dθ/dt<β corresponds to the steering holding state (t1 to t2 in FIGS. 11 and 12). Detecting the abnormality in the apparatus 1 based on this change in T allows the abnormality to be detected according to the above-described characteristic (illustrated in FIGS. 9 and 10), thereby achieving highly accurate abnormality detection. The stuck steering occurs at a relatively early stage in the course of development of the above-described abnormality, and therefore the abnormality can be detected at an initial stage. Further, this configuration eliminates a necessity of a special abnormality detection function such as detection of a foreign object such as rust and water inside the gear housing 10, thereby achieving simplification and a cost reduction of the apparatus 1. The steering angular velocity dθ/dt corresponds to a steering direction signal, which is the rotational direction of the steering wheel. The steering angular velocity dθ/dt is generated based on the received rotational angle signals of the gears 51 and 52 (θ calculated with use of these rotational angle signals). The steering angular velocity calculation portion 6d functions as a steering direction signal reception portion configured to receive a steering direction signal. The ECU 6 may be configured to receive a signal indicating the vehicle turning state (the steering holding state or the steering return state) including the steering direction from another system and introduce it instead of detecting it by the ECU 6 itself.

(Fail-Safe Processing)

The ECU 6 includes the fail-safe processing portion 6j. Therefore, the ECU 6 can perform the processing in the direction further safe for the driver after the abnormality is detected. The fail-safe processing portion 6j outputs the warning to the driver with use of the display apparatus 8 when the abnormality in the apparatus 1 is detected (decided) by the abnormality detection circuit 6i with the startup switch of the vehicle turned on (from S101 to S103 to S106 in FIG. 8). Due to this warning, the driver can be aware of the abnormality. The fail-safe processing portion 6j may output the warning when the abnormality is detected, even before the abnormality is decided. Further, the fail-safe processing portion 6j can use not only a visual display with use of the display apparatus 8 but also a warning sound or the like as a warning method. The fail-safe processing portion 6j allows the assist control to be performed even when the abnormality is detected (decided), until the startup switch is turned off after that (from S101 to S103). This is because, when the abnormality has occurred, the assist control itself can be performed although the steering performance reduces. More specifically, the ECU 6 calculates the instruction signal and outputs the instruction signal to the motor 31 since when the abnormality is detected (decided) until the startup switch is turned off. A steering load on the driver while the vehicle is running can be reduced by continuing the steering assist until the startup switch is turned off in this manner. Therefore, for example, the driver aware of the abnormality due to the warning can easily drive and move the vehicle for repair.

When the abnormality is decided, the fail-safe processing portion 6j records it (from S104 to S105). After that, when the startup switch is turned off and turned on again, the fail-safe processing portion 6j prohibits the execution of the assist control (from S101 to S107 through S102). The ECU 6 does not output the instruction signal to the motor 31. The safety can be improved by refraining from the steering assist when the vehicle is first stopped and then the startup switch is turned on again in this manner. Refraining from the steering assist can prompt the driver to repair the vehicle. The startup switch of the vehicle may be an ignition switch or may be a start switch of the electric vehicle or an HEV, and is not especially limited.

The abnormality detection processing will be described specifically below. The processing when no abnormality has occurred will be described with reference to FIG. 11. Assume that the conditions in S2 to S10 in FIG. 7 are satisfied (from S1 to S11 through S2 to S10). The vehicle is steered in the opposite direction and the steering direction is switched around time t1 to t2. Before time t1, |dθ/dt| is larger than β (a steering progressing state). Therefore, the processing proceeds from S11 to S17 to S25 to S15 to RETURN in FIG. 7. At time t1, |dθ/dt| falls below β (a start of the steering holding state). Therefore, the processing proceeds from S11 to S12 to S13, S14, S15 to RETURN. The fail-safe processing portion 6j stores T as of time t1 as Ts (a positive value) (S13), and also sets the flag to 1 (S14). After time t1 until time t2, |dθ/dt| is smaller than β (the steering holding state). Therefore, the processing proceeds from S11 to S12 to S15 to RETURN. At time t2, |dθ/dt| matches or exceeds β (the steering return state). Therefore, the processing proceeds from S11 to S17, S18, S19, and the fail-safe processing portion 6j stores T as of time t2 (an end of the steering holding state) as Td (a positive value) (S18). Due to Ts≥0 and Ts>Td, the processing proceeds from S19 to S20 to S21 to S22, so that the fail-safe processing portion 6j calculates ΔTt (a positive value) (S21). Since ΔTt is smaller than ΔTt*, the processing proceeds from S22 to S28 to S24 to S25 to S15. Therefore, the fail-safe processing portion 6j sets $C_A$ to 0 (S28) and also sets the flag to 0 (S24), and then clears Ts and Td (S25). Since $C_A$ is smaller than $C_A$*, the processing proceeds from S15 to RETURN, and the fail-safe processing portion 6j does not determine the abnormality. After time t2, |dθ/dt| is β or larger. Therefore, the processing proceeds from S11 to S17 to S25 to S15. Since $C_A$ is smaller than $C_A$*, the processing proceeds from S15 to RETURN, and the fail-safe processing portion 6j does not determine the abnormality.

The processing when the abnormality has occurred will be described with reference to FIG. 12. Assume that the conditions in S2 to S10 are satisfied (from S1 to S11 through S2 to S10). The processing is performed in a similar manner to FIG. 11 until time t2. At time t2, |dθ/dt| matches or exceeds β. Therefore, similarly to FIG. 11, the fail-safe processing portion 6j stores T (a negative value) as of time t2 as Td and calculates ΔTt (a positive value). Since ΔTt is larger than ΔTt*, the processing proceeds from S22 to S23, S24, S25 to S15. Therefore, the fail-safe processing portion 6j adds 1 to $C_A$ (S23) and also sets the flag to 0 (S24), and then clears Ts and Td (S25). Every time the vehicle is steered in the opposite direction, $C_A$ is incremented, provided the same conditions are satisfied. If $C_A$ cumulated (totalized) until the vehicle is steered in the opposite direction this time is smaller than $C_A$*, the processing proceeds from S15 to RETURN, and the fail-safe processing portion 6j does not decide the abnormality. If $C_A$ cumulated until the vehicle is steered in the opposite direction this time is $C_A$ or larger, the processing proceeds from S15 to S16 to RETURN, and the fail-safe processing portion 6j decides the abnormality. After time t2, |dθ/dt| is larger than β. Therefore, the processing proceeds from S11 to S17 to S25 to S15. Because cumulated $C_A$ is not changed, the abnormality is decided as descried above.

The abnormality detection circuit 6i determines the abnormality in the apparatus 1 when the change amount ΔTt of the steering torque T in the predetermined region of dθ/dt (i.e., when dθ/dt is −β<dθ/dt<β) is larger than ΔTt*. The predetermined value ΔTt* functions as an abnormality determination threshold value. As described above, when the abnormality has occurred in the apparatus 1, T is largely changed in the region where the vehicle is steered in the opposite direction compared to that in normal times. Highly accurate abnormality detection can be carried out by detecting this increase in the change in T based on whether ΔTt is ΔTt* or larger. The predetermined value ΔTt* can be set based on an experiment or a simulation (an experiment or the like).

The abnormality detection circuit 6i increments the abnormality determination counter $C_A$ when the change amount ΔTt of the steering torque T is ΔTt* or larger (S22 and S23), and decides the abnormality in the apparatus 1 when $C_A$ reaches the predetermined value $C_A$* (S15 and S16). S22 and S23 function as an abnormality decision counter. In other words, the abnormality detection circuit 6i includes the abnormality decision counter. In this manner, incorrect detection can be prevented or reduced by deciding the abnormality based on the accumulation of $C_A$ without detecting the abnormality based on an abnormal value detected singly. For example, this method can prevent or reduce such incorrect detection that the increase in ΔTt that has occurred singly due to a road surface condition is incorrectly detected as the abnormality in the apparatus 1. The predetermined value $C_A$* can be set based on an experiment or the like. The predetermined value $C_A$ is not limited to 5, and may be set to any value so as to, for example, achieve both the prevention or reduction of the incorrect detection and speed-up of the decision of the abnormality at the same time.

The abnormality in the apparatus 1 that is accompanied by the noticeable change in the steering torque T when the vehicle is steered in the opposite direction (accompanied by the stuck steering) can be caused by an unsmooth progress of the operation of not only the speed reducer 32 but also another portion (for example, a portion where the gears are meshed with each other) in the steering mechanism 2. This unsmooth progress of the operation can be caused by not only rust generated on these portions but also a foreign object such as mud attached on these portions. The rust is generated due to entry of water into the gear housing 10. The entry of water, mud and dust, and the like into the gear housing 10 can occur via not only a portion of the dust boot 233 or 234 which is broken but also a gap at another portion. This gap can also be generated due to, for example, breakage of a component other than the dust boots 233 and 234. The apparatus 1 according to the present embodiment includes the speed reducer 32 between the steering mechanism 2 and the motor 31. The apparatus 1 is the rack assist-type power steering apparatus, and the speed reducer 32 is provided on the rack shaft 23. Therefore, if the water or the like enters the gear housing 10 due to the breakage of the dust boot 233 or 234, this entry easily leads to the unsmooth progress of the operation of the speed reducer 32. This is because the introduced water or the like is likely stored on a vertically lower side of the gear housing 10 (the rack shaft containing portion 101). The abnormality can be highly accurately detected and the safety of the apparatus 1 can be further improved by employing the abnormality detection processing for the apparatus 1 using this speed reducer 32. The speed reducer 32 is not limited to the ball screw mechanism 34, and may be a worm gear mechanism or the like. The speed reducer 32 is the ball screw mechanism 34. The ball screw mechanism 34 easily leads to an increase in the load when the rust is generated or the foreign object is caught inside it. The abnormality can be highly accurately detected and the safety of the apparatus 1 can be further improved by employing the abnormality detection processing for the apparatus 1 using this ball screw mechanism 34. More specifically, the ball screw mechanism 34 includes the first ball screw groove 341, the nut 343, the second ball screw groove 342, and the plurality of balls 344. The first ball screw groove 341 is provided on the outer peripheral side of the rack shaft 23. The nut 343 is annularly formed from the ferrous metallic material so as to surround the rack shaft 23, and is provided rotatably relative to the rack shaft 23. The second ball screw groove 342 is provided on the inner peripheral side of the nut 343, and forms the ball circulation groove 345 together with the first ball screw groove 341. The plurality of balls 344 is made from the ferrous metallic material, and is provided inside the ball circulation groove 345. Therefore, when the rust is generated on the ball circulation groove 345 or the balls 344, or the foreign object is caught therebetween, this raises a possibility of an increase in the load and the dulled operations of the ball screw mechanism 34 and the rack shaft 23.

(Condition for Intervention of Abnormality Detection Processing)

With a self-aligning torque (SAT) generated on the turning target wheel, the steering wheel is returned to the neutral side smoothly due to the SAT if the apparatus 1 is normal, when the driver returns the steering wheel in the opposite direction. On the other hand, if the abnormality has occurred in the apparatus 1, this makes it difficult for the steering wheel to be returned to the neutral side even with the aid of the SAT. In this manner, the difference $\Delta Tt$ in the change in the steering torque T between when the apparatus 1 is normal and when the apparatus 1 is abnormal is noticeably generated in a driving region where the SAT is generated. The abnormality detection circuit 6i carries out the abnormality detection in the region where this SAT is generated. Therefore, the highly accurate abnormality detection can be carried out with use of noticeably generated $\Delta Tt$. The improvement of the accuracy of the abnormality detection can, for example, prevent or reduce incorrect execution of the fail-safe processing.

More specifically, the SAT is generated according to the increase in the vehicle velocity V. When V is a predetermined value or higher, $\Delta Tt$ is noticeably generated due to the generation of the SAT. The abnormality detection circuit 6i carries out the abnormality detection when the value of the vehicle velocity signal is the predetermined value V* or larger (from S2 to S3). Therefore, the accuracy of the abnormality detection can be improved by carrying out the abnormality detection in a vehicle velocity region where the SAT ($\Delta Tt$) is sufficiently generated. In other words, the abnormality detection circuit 6i refrains from carrying out the abnormality detection when the value of the vehicle velocity signal is smaller than V* (from S2 to S24). The incorrect detection can be prevented or reduced and the accuracy of the detection can be improved by refraining from carrying out the abnormality detection in a low vehicle velocity region where the SAT ($\Delta Tt$) is insufficient. The predetermined value V* can be set based on an experiment or the like. The predetermined value V* may be any value that can generate the SAT ($\Delta Tt$) sufficient for the abnormality detection, and is not limited to 15 km/h.

Further, the SAT is generated according to an increase in the steering angle $\theta$. When the value of $\theta$ is a predetermined value or larger, $\Delta Tt$ is noticeably generated due to the generation of the SAT. The abnormality detection circuit 6i carries out the abnormality detection when the value of the steering angle signal is the predetermined value G* or larger (from S3 to S4). The accuracy of the detection can be improved by carrying out the abnormality detection in a steering angle region where the SAT ($\Delta Tt$) is sufficiently generated. In other words, the abnormality detection circuit 6i refrains from carrying out the abnormality detection when the value of the steering angle signal is smaller than $\theta^*$ (from S3 to S24). The incorrect detection can be prevented or reduced and the accuracy of the detection can be improved by refraining from carrying out the abnormality detection in a steering angle region where the SAT ($\Delta Tt$) is insufficient. The predetermined value $\theta^*$ can be set based on an experiment or the like. The predetermined value $\theta^*$ may be any value that can generate the SAT ($\Delta Tt$) sufficient for the abnormality detection, and is not limited to 10 degrees. Further, because an excessively large value of $\theta$ leads to a reduction in the SAT, the abnormality detection circuit 6i may be configured to carry out the abnormality detection when the value of the steering angle signal is a predetermined value (such a second predetermined value that the SAT does not reduce excessively) or smaller.

In other words, the abnormality detection circuit 6i carries out the abnormality detection when the value of the SAT is the predetermined value (accompanied by the generation of $\Delta Tt$ sufficient for the abnormality detection) or larger, and refrains from carrying out the abnormality detection when the value of the SAT is smaller than the above-described predetermined value. The above-described predetermined value can be set based on an experiment or the like. The abnormality detection circuit 6i may be configured to directly calculate the SAT (based on, for example, $\theta$, V, vehicle specifications, and the like), and carry out the abnormality detection when determining that this SAT is the above-described predetermined value or larger.

When the steering operation is performed at a speed exceeding the rotational speed of the motor 31 (the rotational speed of the steering wheel corresponding thereto), the motor 31 acts as a load, and an increase in the steering torque T due to this load may be incorrectly detected as the abnormality in the apparatus 1. The abnormality detection circuit 6i refrains from carrying out the abnormality detection when the value of the steering angular velocity signal is the predetermined value $\alpha$ or larger (from S4 to S24). The incorrect detection can be prevented or reduced and the accuracy of the detection can be improved by refraining from carrying out the abnormality detection in a steering angular velocity region where the motor 31 acts as the load. In other words, the abnormality detection circuit 6i carries out the abnormality detection when the value of the steering angular velocity signal is smaller than $\alpha$ (from S4 to S5). The accuracy of the detection can be improved by carrying out the abnormality detection in a steering angular velocity region where the motor 31 does not act as the load. The above-described predetermined value can be set based on an experiment or the like.

When the vehicle acceleration is high, a distortion of a suspension of the vehicle or the like increases, and a load is generated on the steering mechanism 2. This load also affects the characteristic (the hysteresis) of the change in the steering torque T, thereby raising a possibility of incorrect detection of the abnormality in the apparatus 1. The abnormality detection circuit 6i refrains from carrying out the abnormality detection when the value of the acceleration signal is the predetermined value or larger (from S5 to S24). The incorrect detection of the abnormality can be prevented or reduced and the accuracy of the detection can be improved by refraining from carrying out the abnormality detection in an acceleration region that affects the characteristic of the change in T. In other words, the abnormality detection circuit 6i carries out the abnormality detection when the value of the acceleration signal is smaller than the above-described predetermined value (from S5 to S6). The accuracy of the detection can be improved by carrying out the abnormality detection in an acceleration region that little affects the characteristic of the change in T. The above-described predetermined value can be set based on an experiment or the like. The acceleration signal may be the signal output from the acceleration sensor or may be calculated based on the vehicle velocity signal and the steering angle signal.

When the pneumatic pressure of the tire of the turning target wheel reduces, the steering torque T (the steering load) increases and the SAT reduces. This increase in T is attributed to another cause than the abnormality in the apparatus 1. Therefore, the abnormality in the apparatus 1 may be incorrectly detected. Further, the reduction in the SAT may lead to deterioration of the accuracy of the detection. The abnormality detection circuit 6i refrains from carrying out the abnormality detection when the pneumatic pressure is the predetermined value or lower (from S6 to S24). In other words, the abnormality detection circuit 6i carries out the abnormality detection when the pneumatic pressure signal is larger than the above-described predetermined value (from S6 to S7). Therefore, the incorrect detection can be prevented or reduced, and the accuracy of the detection can be improved. The above-described predetermined value can be set based on an experiment or the like.

When the steering operation is further performed in a steering progressing direction with the turning target wheel (the rack shaft 23) located at the stroke end, the steering torque T increases compared to another steering state. This increase in the steering torque T is attributed to another cause than the abnormality in the apparatus 1. Therefore, the abnormality in the apparatus 1 may be incorrectly detected. The abnormality detection circuit 6i refrains from carrying out the abnormality detection when the turning target wheel (the rack shaft 23) is determined, based on the steering angle signal, to be located at the stroke end (from S7 to S24). For example, if the value |θ| of θ is the predetermined value or larger, the turning target wheel (the rack shaft 23) is determined to be located at the stroke end. The above-described predetermined value can be set based on an experiment or the like. In other words, the abnormality detection circuit 6i carries out the abnormality detection when the turning target wheel (the rack shaft 23) is determined to be not at the stroke end (determined to be located in the movable range) (from S7 to S8). Therefore, the incorrect detection can be prevented or reduced, and the accuracy of the detection can be improved.

When the instruction signal of the motor 31 is limited due to some cause, such as the overheating of the motor 31, the steering load increases and the steering torque T increases. This increase in the steering torque T is attributed to another cause than the abnormality in the apparatus 1 (the deterioration of the operation of the steering mechanism 2 including the assist mechanism 3). Therefore, the abnormality in the apparatus 1 may be incorrectly detected. The abnormality detection circuit 6i refrains from carrying out the abnormality detection when the instruction signal limit circuit 6l limits the instruction signal (from S8 to S24). In other words, the abnormality detection circuit 6i carries out the abnormality detection when the instruction signal is not limited (from S8 to S9). Therefore, the incorrect detection can be prevented or reduced, and the accuracy of the detection can be improved.

When the ambient temperature is low, the steering load may increase and the steering torque T may increase due to an increase in viscosity of grease applied to the steering mechanism 2 and/or frozen moisture attached to the steering mechanism 2. This increase in T is attributed to another cause than the abnormality in the apparatus 1. The abnormality detection circuit 6i refrains from carrying out the abnormality detection when the temperature signal is the predetermined value or smaller (from S9 to S24). In other words, the abnormality detection circuit 6i carries out the abnormality detection when the temperature signal is larger than the above-described predetermined value (from S9 to S10). The above-described predetermined value is, for example, 0 degrees Celsius at which the moisture is frozen. Therefore, the incorrect detection can be prevented or reduced, and the accuracy of the detection can be improved. The above-described predetermined value can also be set based on an experiment or the like.

When the alternative instruction signal calculation portion 6p calculates the instruction signal, an abnormality may have occurred in the steering torque signal, and use of this steering torque signal may cause the incorrect detection of the abnormality in the apparatus 1 (the deterioration of the operation of the steering mechanism 2 including the assist mechanism 3). The abnormality detection circuit 6i refrains from carrying out the abnormality detection when the alternative instruction signal is calculated (from S10 to S24). In other words, the abnormality detection circuit 6i carries out the abnormality detection using the steering torque signal when the alternative instruction signal is not calculated (from S10 to S11). Therefore, the incorrect detection can be prevented or reduced, and the accuracy of the detection can be improved.

Second Embodiment

Figure 13:
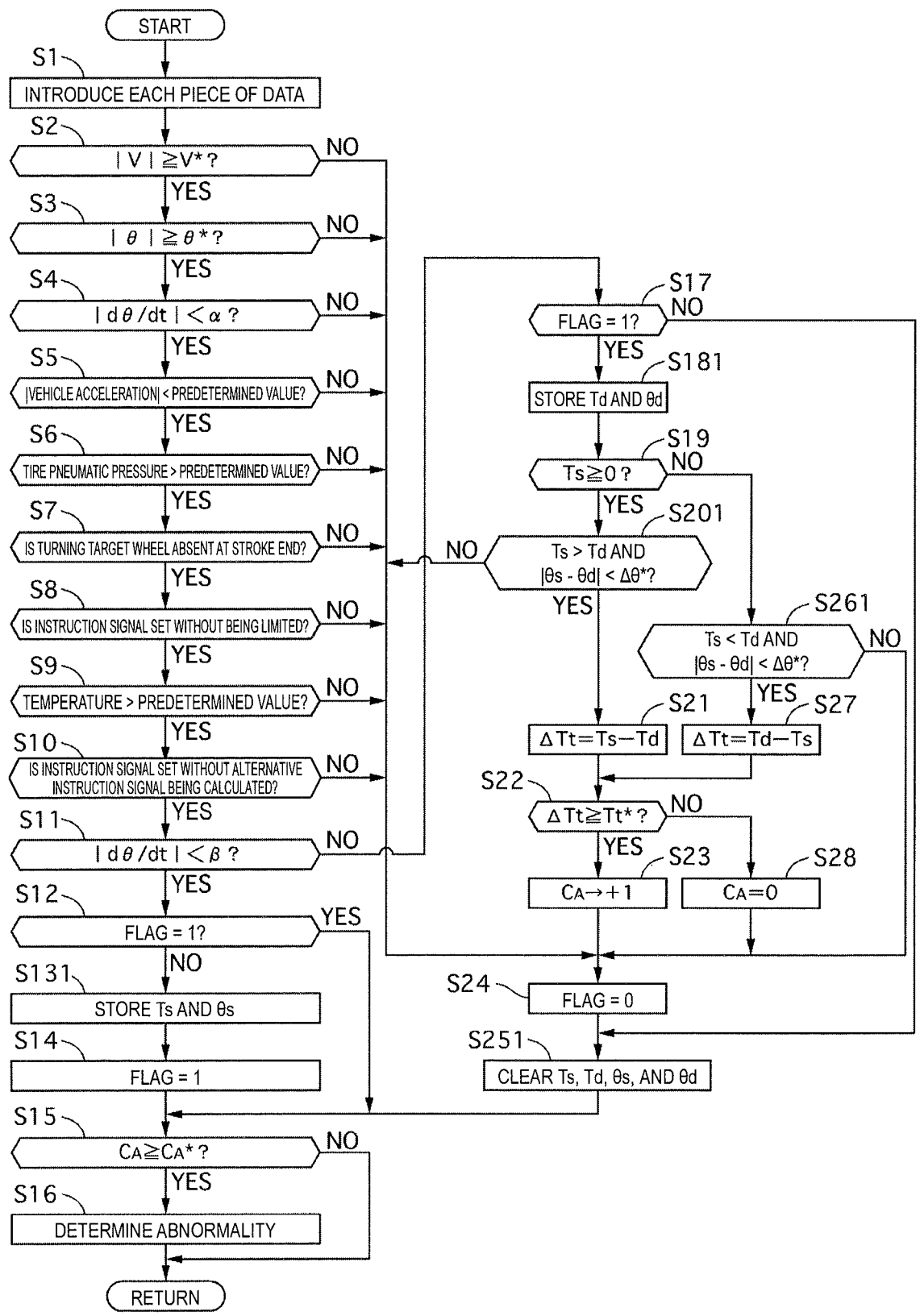
FIG. 13 illustrates a flow of abnormality detection processing according to a second embodiment.

FIG. 13 is a flowchart similar to FIG. 7 that illustrates a flow of abnormality detection processing according to the present embodiment. This flow is similar to FIG. 7 except that S13 is replaced with S131, S18 is replaced with S181, S20 is replaced with S201, S25 is replaced with S251, and S26 is replaced with S261. In S131, the abnormality detection circuit 6i stores the steering torque Ts and a steering angle θs as of this moment (introduced in S1 in the present cycle). In S181, the abnormality detection circuit 6i stores the steering torque Td and a steering angle θd as of this moment (introduced in S1 in the present cycle). In S201, the abnormality detection circuit 6i determines whether Ts is larger than Td, and a value |θs−θd| of a difference between θs and θd is smaller than a predetermined value Δθ* (for example, a small value as small as approximately 2 degrees). If Ts is larger than Td, and |θs−θd| is smaller than Δθ*, the processing proceeds to S21. If Ts is Td or smaller, or |θs−θd| is Δθ* or larger, the processing proceeds to step S24. In S251, the abnormality detection circuit 6i clears Ts, Td, θs, and θd. In S261, the abnormality detection circuit 6i determines whether Ts is smaller than Td, and |θs−θd| is smaller than Δθ*. If Ts is smaller than Td, and |θs−θd| is smaller than Δθ*, the processing proceeds to S27. If Ts is Td or larger, or |θs−θd| is Δθ* or larger, the processing proceeds to S24. The other configuration is similar to the first embodiment.

When the change amount |θs−θd| of the steering angle θ in the predetermined region of dθ/dt (−β<dθ/dt<β) is smaller than the predetermined value Δθ*, the abnormality detection circuit 6i carries out the detection of the abnormality in the apparatus 1 based on the change in the steering torque T in this region (−β<dθ/dt<β) (S201 or S261). Whether the steering is in the steering holding state can be highly accurately determined regardless of a duration of the steering holding state, by determining, based on whether |θs−θd| is smaller than Δθ*, the steering holding state (time t1 to t2 in FIGS. 11 and 12) when the vehicle is steered in the opposite direction in this manner. Therefore, the present configuration can further improve the accuracy of the abnormality detection based on the change in T in the steering holding state. The predetermined value Δθ* can be set based on an experiment or the like. The predetermined value Δθ* may be any value that allows the steering holding state to be determined, and is not limited to 2 degrees.

Third Embodiment

Figure 14:
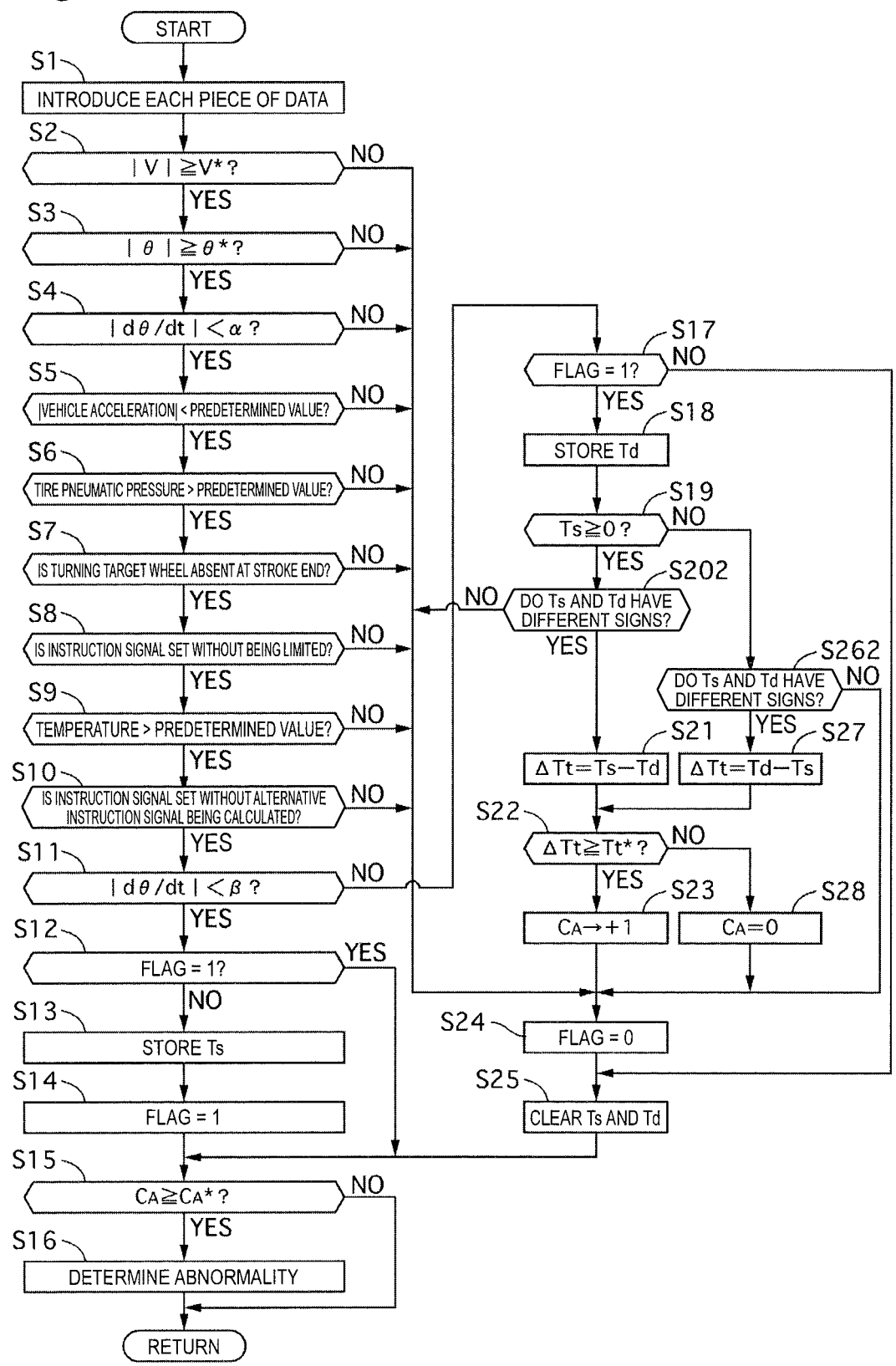
FIG. 14 illustrates a flow of abnormality detection processing according to the third embodiment.

FIG. 14 is a flowchart similar to FIG. 7 that illustrates a flow of abnormality detection processing according to the present embodiment. This flow is similar to FIG. 7 except that S20 is replaced with S202 and S26 is replaced with S262. In S202, the abnormality detection circuit 6i determines whether the (plus or minus) sign is different between Ts and Td. If Ts and Td have different signs from each other (i.e., Ts has a plus sign and Td has a minus sign), the processing proceeds to S21. If Ts and Td have the same signs as each other (i.e., Ts and Td have plus signs), the processing proceeds to S24. In S262, the abnormality detection circuit 6i determines whether the (plus or minus) sign is different between Ts and Td. If Ts and Td have different signs from each other (i.e., Ts has a minus sign and Td has a plus sign), the processing proceeds to S27. If Ts and Td have the same signs as each other (i.e., Ts and Td have minus signs), the processing proceeds to S24. The other configuration is similar to the first embodiment.

The abnormality detection circuit 6i carries out the detection of the abnormality in the apparatus 1 when the direction of the steering torque T is switched in the predetermined region of $d\theta/dt$ ($-\beta < d\theta/dt < \beta$). More specifically, if T has a different sign between when $d\theta/dt$ enters this region ($-\beta < d\theta/dt < \beta$) (time t1 in FIGS. 11 and 12) and when $d\theta/dt$ exits this region (time t2 in FIGS. 11 and 12), the abnormality detection circuit 6i carries out the detection of the abnormality in the apparatus 1 based on the change in T in this region. In other words, if the direction of T is changed in the steering holding state when the vehicle is steered in the opposite direction (the sign of T is inverted between before and after the steering holding state), the change in T in this steering holding state is noticeable. In such a case, the abnormality can be further reliably (accurately) detected by carrying out the detection of the abnormality in the apparatus 1 based on the change in T.

Fourth Embodiment

Figure 15:
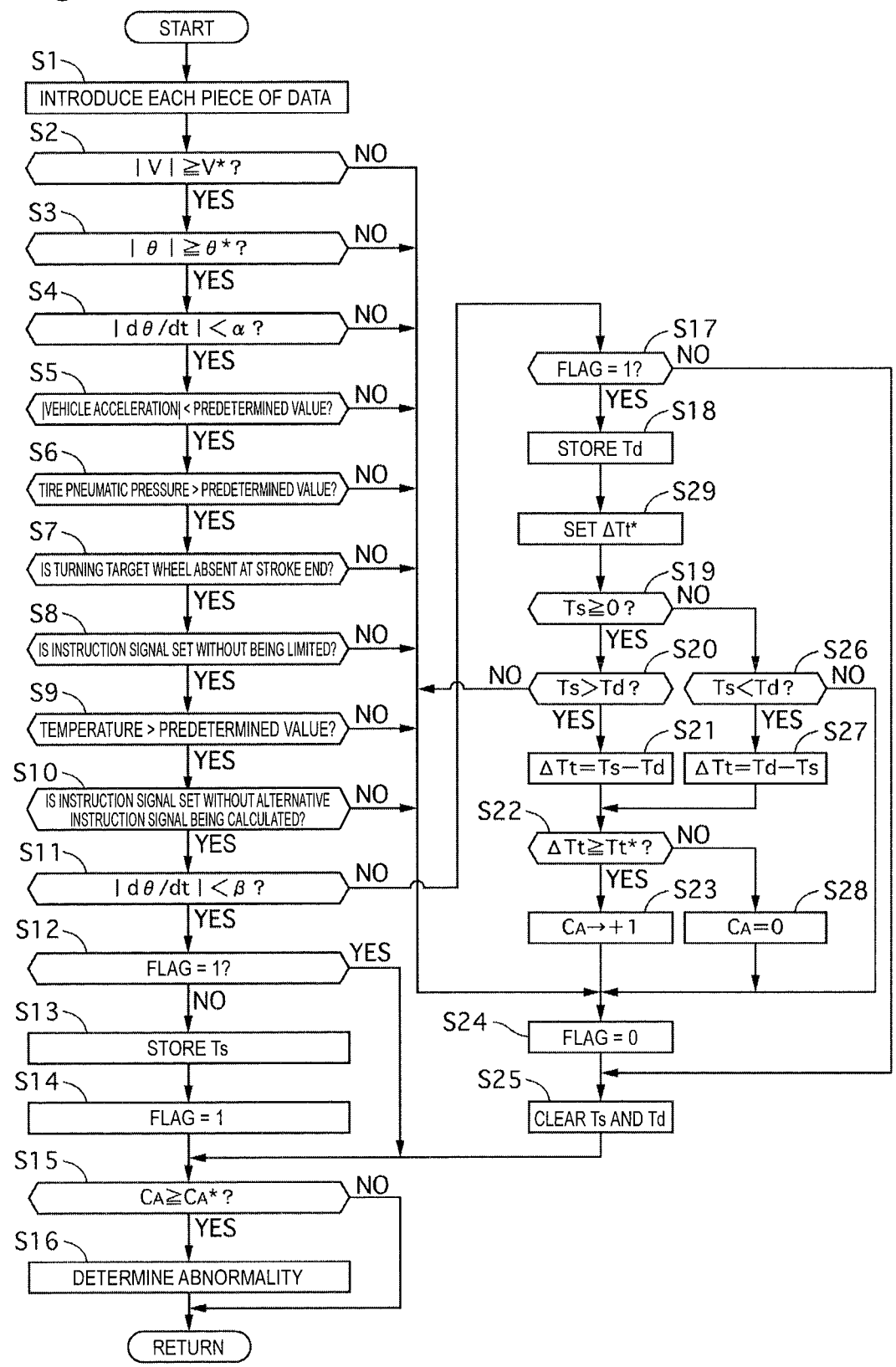
FIG. 15 illustrates a flow of abnormality detection processing according to the fourth embodiment.
Figure 16:
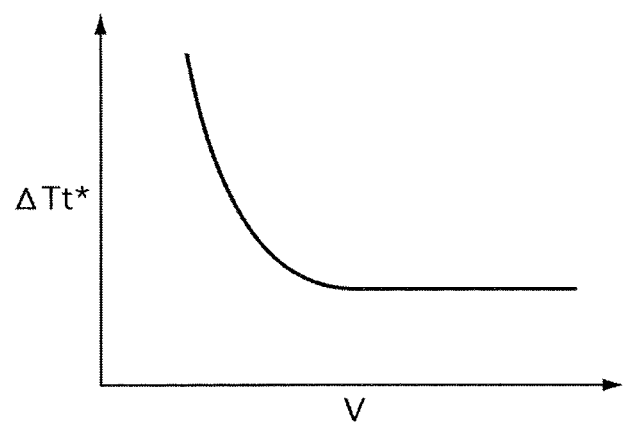
FIG. 16 illustrates a relationship between an abnormality determination threshold value and a vehicle velocity according to the fourth embodiment.

FIG. 15 is a flowchart similar to FIG. 7 that illustrates a flow of abnormality detection processing according to the present embodiment. This flow is similar to FIG. 7 except that S29 is added between S18 and S19. In S29, the abnormality detection circuit 6i sets the predetermined value $\Delta Tt^*$. The abnormality detection circuit 6i calculates $\Delta Tt^*$ based on the vehicle velocity V. For example, $\Delta Tt^*$ can be acquired with use of a map having a characteristic like an example illustrated in FIG. 16. The abnormality detection circuit 6i reduces $\Delta Tt^*$ as V increases. The abnormality detection circuit 6i reduces $\Delta Tt^*$ by a smaller amount with respect to the increase in V when V is high than when V is low in a predetermined range on a low vehicle velocity side. The abnormality detection circuit 6i keeps $\Delta Tt^*$ at a constant value in a predetermined range on a high vehicle velocity side. The abnormality detection circuit 6i may set $\Delta Tt^*$ according to not only V but also another driving state of the vehicle, such as $\theta$. The other configuration is similar to the first embodiment.

The characteristic of the change in the steering torque T in the steering holding state when the vehicle is steered in the opposite direction is changed according to the vehicle velocity V. For example, as V increases, the SAT increases and therefore the change amount $\Delta Tt$ of T in the steering holding state reduces. The abnormality detection circuit 6i variably controls the abnormality determination threshold value $\Delta Tt^*$ according to the change in the vehicle velocity signal. The present configuration can determine the change in T (how large $\Delta Tt$ is) caused by the abnormality in the apparatus 1 while eliminating an influence due to V, by setting $\Delta Tt^*$ according to the characteristic of the change in T changing according to V. Therefore, the incorrect detection of the abnormality can be prevented or reduced, and the accuracy of the abnormality detection using $\Delta Tt^*$ can be improved. More specifically, the abnormality detection circuit 6i reduces $\Delta Tt^*$ as the vehicle velocity signal increases. Even if the abnormality has occurred in the apparatus 1, the change amount $\Delta Tt$ of T reduces due to the increase in the SAT as V increases. If $\Delta Tt^*$ is unchanged, this would make it difficult to determine the change in T caused by the abnormality in the apparatus 1. On the other hand, changing $\Delta Tt^*$ so as to reduce $\Delta Tt^*$ as V increases makes it easy to determine the change in T caused by the abnormality in the apparatus 1 while eliminating the influence due to V. Therefore, the present configuration can detect the abnormality at a further early stage while improving the accuracy of the abnormality detection.

Fifth Embodiment

Figure 17:
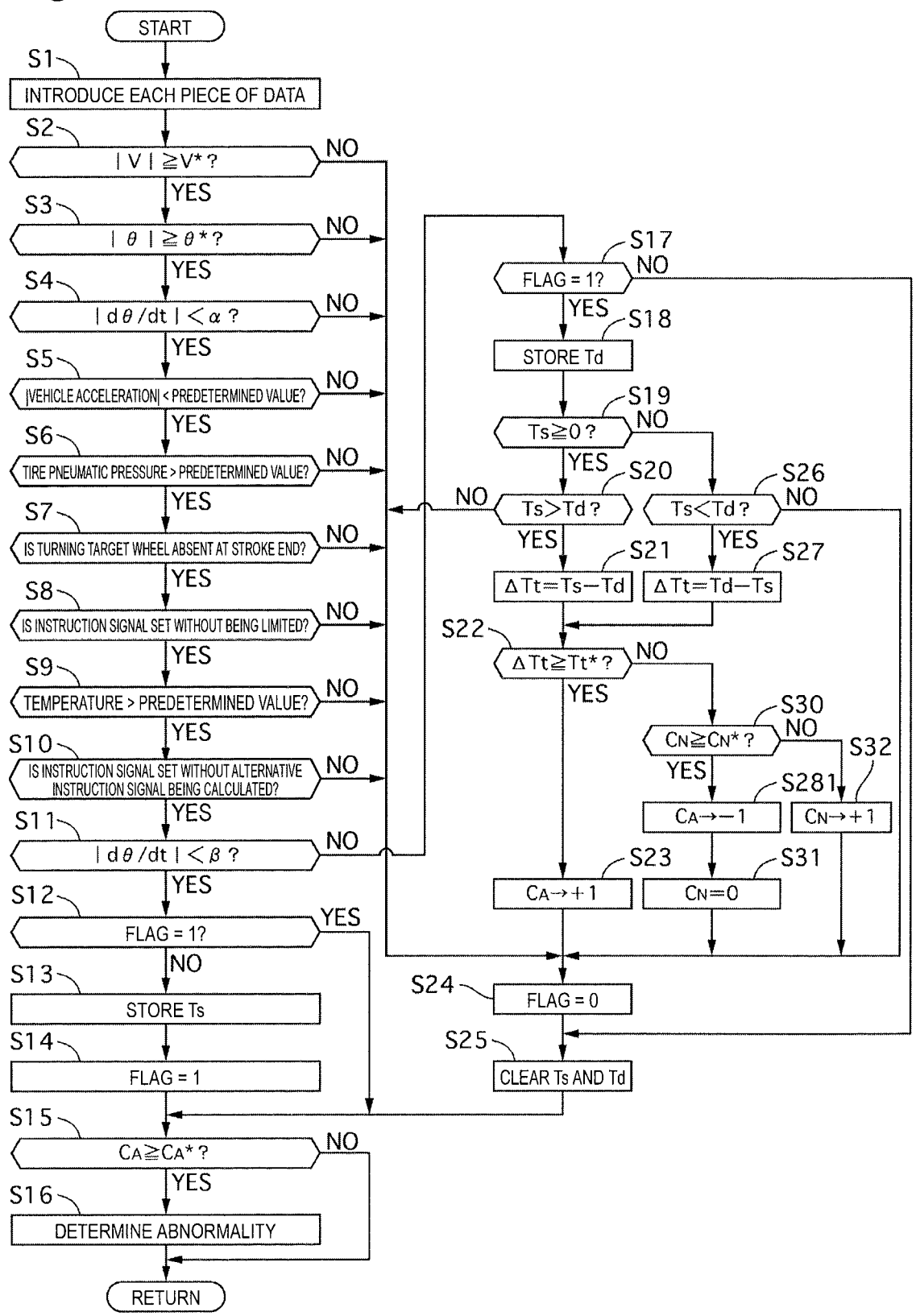
FIG. 17 illustrates a flow of abnormality detection processing according to a fifth embodiment.

FIG. 17 is a flowchart similar to FIG. 7 that illustrates a flow of abnormality detection processing according to the present embodiment. This flow is similar to FIG. 7 except that S28 is replaced with S281 and S30 to S32 are further added. If $\Delta Tt$ is smaller than $\Delta Tt^*$ in S22, the processing proceeds to S30. In S30, the abnormality detection circuit 6i determines whether a normality determination counter $C_N$ is a predetermined value $C_N^*$ (for example, 3) or larger. If ON is $C_N^*$ or larger, the processing proceeds to S281. If $C_N$ is smaller than $C_N^*$, the processing proceeds to S32. In S281, the abnormality detection circuit 6i subtracts 1 from $C_A$ (decrements $C_A$). Then, the processing proceeds to S31. In S31, the abnormality detection circuit 6i sets $C_N$ to 0. Then, the processing proceeds to S24. In S32, the abnormality detection circuit 6i adds 1 to $C_N$. Then, the processing proceeds to S24. The other configuration is similar to the first embodiment.

The abnormality determination counter $C_A$ may be incorrectly incremented due to noise or the like (S23). Accumulation of such $C_A$ may result in incorrect decision of the abnormality in the apparatus 1. If the change amount $\Delta Tt$ of the steering torque T is smaller than the abnormality determination threshold value $\Delta Tt^*$, in S281, the abnormality detection circuit 6i decrements the abnormality determination counter $C_A$. This operation prevents or reduces the incorrect accumulation of $C_A$, thereby contributing to preventing or reducing the incorrect decision of the abnormality. In other words, even if $C_A$ is incorrectly incremented (S23), the apparatus 1 can be determined to be normal if $\Delta Tt$ is smaller than $\Delta Tt^*$, and therefore the abnormality detection circuit 6i decrements $C_A$ (S281) in a cycle after that. When $C_A$ reaches $C_A^*$ again, the abnormality detection circuit 6i decides the abnormality in the apparatus 1 (S15 and S16). In addition to S22 and S23, S281 functions as the abnormality decision counter.

If the apparatus 1 is determined to be normal, the abnormality detection circuit 6i does not set $C_A$ to 0 but subtracts 1 from $C_A$ (S281). This operation eliminates a necessity of waiting until $C_A$ is cumulated to reach $C_A^*$ again, starting from 0, when the abnormality has occurred in the apparatus 1. Therefore, the abnormality can be decided at a further early stage. More specifically, the apparatus 1 may be incorrectly determined to be normal due to noise or the like (the abnormality detection circuit 6i determines NO in S22). The apparatus 1 can be determined to be abnormal if $\Delta Tt$ is $\Delta Tt^*$ or larger in a cycle after that. Therefore, the abnormality detection circuit 6i gradually decrements $C_A$ without uniformly setting $C_A$ to 0 even when the apparatus 1 is determined to be normal in the present cycle (S281). Therefore, the present configuration can prevent or reduce a delay in the decision of the abnormality due to the incorrect determination of the normality.

The abnormality detection circuit $6i$ increments the normality determination counter $C_N$ when $\Delta Tt$ is smaller than $\Delta Tt^*$ (C32), and decrements the abnormality determination counter $C_A$ when $C_N$ reaches $C_N^*$ (from S30 to S281). The incorrect detection can be prevented or reduced by decrementing $C_A$ according to the accumulation of $C_N$ without detecting a normality according to a normal value detected singly in this manner. For example, the present configuration can prevent or reduce such incorrect detection that a reduction in $\Delta Tt$ that is caused singly due to the road surface condition is incorrectly detected as the normality in the apparatus 1. The predetermined value $C_N^*$ can be set based on an experiment or the like. The predetermined value $C_N^*$ is not limited to 3, and may be set to any value so as to, for example, achieve both the prevention or reduction of the incorrect detection and speed-up of the decision of the abnormality at the same time.

Other Embodiments

Having described the present invention based on the embodiments thereof, the specific configuration of the present invention is not limited to the configurations indicated in the embodiments. The present invention also includes a design modification and the like thereof made within a range that does not depart from the spirit of the present invention. Further, the individual components described in the claims and the specification can be arbitrarily combined or omitted within a range that allows them to remain capable of achieving at least a part of the above-described objects or producing at least a part of the above-described advantageous effects. For example, the power steering apparatus is not limited to the rack assist-type power steering apparatus and may be a pinion assist-type power steering apparatus. The various kinds of calculation portions and reception portions are realized by software in the microcomputer in the embodiments, but may be realized by an electronic circuit. The calculation refers to not only a calculation of an equation but also all kinds of processing on software. The reception portion may be an interface in the microcomputer or may be software in the microcomputer.

The present application claims priority to Japanese Patent Application No. 2015-216317 filed on Nov. 4, 2015. The entire disclosure of Japanese Patent Application No. 2015-216317 filed on Nov. 4, 2015 including the specification, the claims, the drawings, and the abstract is incorporated herein by reference in its entirety.

REFERENCE SIGN LIST 1 power steering apparatus
2 steering mechanism
21 steering shaft
23 rack shaft (rack bar)
31 electric motor
32 speed reducer
34 ball screw mechanism
341 first ball screw groove (turning target wheel-side ball screw groove)
342 second ball screw groove (nut-side ball screw groove)
343 nut
344 ball
346 tube (circulation member)
4 steering torque sensor
6 control unit (control apparatus)
6a vehicle velocity signal reception portion
6c steering angle signal processing portion (steering angle signal reception portion)
6d steering angular velocity calculation portion (steering angular velocity signal reception portion, steering direction signal reception portion)
6e acceleration signal reception portion
6f pneumatic signal reception portion
6g temperature signal reception portion
6i abnormality detection circuit
6k instruction signal calculation portion
6l instruction signal limit circuit
6p alternative instruction signal calculation portion

The invention claimed is:

1. A power steering apparatus comprising:
a steering mechanism configured to transmit a rotation of a steering wheel to a turning target wheel;
an electric motor configured to provide a steering force to the steering mechanism;
a torque sensor configured to detect a steering torque generated on the steering mechanism; and
a control unit configured to calculate an instruction signal for controlling driving of the electric motor based on the steering torque and output the instruction signal to the electric motor,
wherein the control unit includes
a steering direction signal reception portion configured to receive a steering direction signal indicating a rotational direction of the steering wheel, and
an abnormality detection circuit configured to carry out detection of an abnormality in the power steering apparatus based on a change in the steering torque in a predetermined region including a region in which the steering direction signal is switched.

2. The power steering apparatus according to claim 1, wherein the abnormality detection circuit determines that the power steering apparatus is abnormal when a change amount of the steering torque in the predetermined region is an abnormality determination threshold value or larger.

3. The power steering apparatus according to claim 2, wherein the control unit includes an abnormality decision counter, and
wherein the abnormality decision counter increments an abnormality determination counter when the change amount of the steering torque is a predetermined value serving as the abnormality determination threshold value or larger, and decides the abnormality in the power steering apparatus when the abnormality determination counter reaches a predetermined value.

4. The power steering apparatus according to claim 3, wherein the abnormality decision counter decrements the abnormality decision counter when the change amount of the steering torque is smaller than the abnormality determination threshold value.

5. The power steering apparatus according to claim 1, wherein the control unit includes a vehicle velocity signal reception portion configured to receive a vehicle velocity signal, and
wherein the abnormality detection circuit carries out the detection of the abnormality when the vehicle velocity signal is a predetermined value or larger.

6. The power steering apparatus according to claim 5, wherein the abnormality detection circuit determines that the power steering apparatus is abnormal when a change amount of the steering torque in the predetermined region is an abnormality determination threshold value or larger, and also variably controls the abnormality determination threshold value according to a change in the vehicle velocity signal.

7. The power steering apparatus according to claim 6, wherein the abnormality detection circuit reduces the abnormality determination threshold value as the vehicle velocity signal increases.

8. The power steering apparatus according to claim 5, wherein the control unit includes a steering angle signal reception portion configured to receive a steering angle signal, and
wherein the abnormality detection circuit carries out the detection of the abnormality when the steering angle signal is a predetermined value or larger.

9. The power steering apparatus according to claim 1, wherein the abnormality detection circuit carries out the detection of the abnormality when a self-aligning torque generated on the turning target wheel is a predetermined value or larger.

10. The power steering apparatus according to claim 1, wherein the control unit includes a steering angle signal reception portion configured to receive a steering angle signal, and
wherein the abnormality detection circuit refrains from carrying out the detection of the abnormality when the steering angle signal is smaller than a predetermined value.

11. The power steering apparatus according to claim 1, wherein the control unit includes a steering angular velocity signal reception portion configured to receive a steering angular velocity signal, and
wherein the abnormality detection circuit refrains from carrying out the detection of the abnormality when the steering angular velocity signal is a predetermined value or larger.

12. The power steering apparatus according to claim 1, wherein the control unit includes a gravitational acceleration signal reception portion configured to receive a gravitational acceleration signal of a vehicle, and
wherein the abnormality detection circuit refrains from carrying out the detection of the abnormality when the gravitational acceleration signal is a predetermined value or larger.

13. The power steering apparatus according to claim 1, wherein the control unit includes a pneumatic signal reception portion configured to receive a pneumatic signal of a tire, and
wherein the abnormality detection circuit refrains from carrying out the detection of the abnormality when the pneumatic signal is a predetermined value or smaller.

14. The power steering apparatus according to claim 1, wherein the control unit includes a steering angle signal reception portion configured to receive a steering angle signal, and
wherein the abnormality detection circuit refrains from carrying out the detection of the abnormality when the turning target wheel is determined to be located at a stroke end, based on the steering angle signal.

15. The power steering apparatus according to claim 1, wherein the control unit includes an instruction signal limit circuit configured to limit the instruction signal, and
wherein the abnormality detection circuit refrains from carrying out the detection of the abnormality when the instruction signal limit circuit limits the instruction signal.

16. The power steering apparatus according to claim 1, wherein the control unit includes a temperature signal reception portion configured to receive an ambient temperature signal, and
wherein the abnormality detection circuit refrains from carrying out the detection of the abnormality when the temperature signal is a predetermined value or smaller.

17. The power steering apparatus according to claim 1, wherein the control unit includes an alternative instruction signal calculation portion configured to calculate the instruction signal, based on a signal other than the steering torque, and
wherein the abnormality detection circuit refrains from carrying out the detection of the abnormality when the alternative instruction signal calculation portion calculates the instruction signal.

18. The power steering apparatus according to claim 1, wherein the control unit calculates the instruction signal and outputs the instruction signal to the electric motor since the abnormality in the apparatus is detected by the abnormality detection circuit until a startup switch of a vehicle is turned off, and
wherein the control unit does not output the instruction signal to the electric motor when the startup switch is turned on again after the startup switch is turned off.

19. The power steering apparatus according to claim 1, further comprising a speed reducer provided between the steering mechanism and the electric motor,
wherein the steering mechanism includes a steering shaft configured to rotate according to the rotation of the steering wheel, and a rack bar configured to axially move according to the rotation of the steering shaft, and
wherein the speed reducer includes
a turning target wheel-side ball screw groove provided on an outer peripheral side of the rack bar and having a spiral groove shape,
a nut formed annularly from a ferrous metallic material so as to surround the rack bar and provided rotatably relative to the rack bar,
a nut-side ball screw groove provided on an inner peripheral side of the nut, having a spiral groove shape, and forming a ball circulation groove together with the turning target wheel-side ball screw,
a plurality of balls made from a ferrous metallic material and provided in the ball circulation groove, and
a circulation member provided on an outer side of the nut in a radial direction with respect to a rotational axis of the nut and connecting one end side and an opposite end side of the ball circulation groove so as to allow the plurality of balls to be circulated from the one end side to the opposite end side of the ball circulation groove.

20. A control apparatus for a power steering apparatus, the power steering apparatus including a steering mechanism configured to transmit a rotation of a steering wheel to a turning target wheel, an electric motor configured to provide a steering force to the steering mechanism, and a torque sensor configured to detect a steering torque generated on the steering mechanism, the control apparatus comprising:
an instruction signal calculation portion configured to calculate, based on the steering torque, an instruction signal for controlling driving of the electric motor and output the instruction signal to the electric motor;
a steering direction signal reception portion configured to receive a steering direction signal indicating a rotational direction of the steering wheel; and an abnormality detection circuit configured to carry out detection of an abnormality in the power steering apparatus based on a change in the steering torque in a predetermined region including a region in which the steering direction signal is switched.

* * * * *